US011864224B2

(12) United States Patent
Akkarakaran et al.

(10) Patent No.: US 11,864,224 B2
(45) Date of Patent: *Jan. 2, 2024

(54) TECHNIQUES FOR HANDLING SCHEDULING CONFLICTS BETWEEN ACCESS LINK COMMUNICATIONS AND SIDELINK COMMUNICATIONS

(71) Applicant: QUALCOMM Incorporated, San Diego, CA (US)

(72) Inventors: Sony Akkarakaran, Poway, CA (US); Tao Luo, San Diego, CA (US); Junyi Li, Fairless Hills, PA (US); Jung Ho Ryu, Fort Lee, NJ (US); Juan Montojo, San Diego, CA (US); Kapil Gulati, Belle Mead, NJ (US); Sudhir Kumar Baghel, Pleasanton, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,236

(22) Filed: Jan. 20, 2023

(65) Prior Publication Data
US 2023/0156777 A1    May 18, 2023

Related U.S. Application Data

(63) Continuation of application No. 16/943,346, filed on Jul. 30, 2020, now Pat. No. 11,589,369.

(Continued)

(51) Int. Cl.
*H04W 28/04*     (2009.01)
*H04W 72/51*     (2023.01)
*H04W 72/566*    (2023.01)

(52) U.S. Cl.
CPC ......... *H04W 72/566* (2023.01); *H04W 28/04* (2013.01); *H04W 72/51* (2023.01)

(58) Field of Classification Search
CPC .............................. H04W 28/04; H04W 72/54
(Continued)

(56) References Cited

U.S. PATENT DOCUMENTS 10,455,587 B2    10/2019   Seo
2021/0037549 A1*  2/2021   Akkarakaran ...... H04W 72/566

FOREIGN PATENT DOCUMENTS

CN    107079336 A     8/2017
WO    2020033628 A1   2/2020

OTHER PUBLICATIONS

Intel Corporation: "In-Device Coexistence Issues for EV2X Communication", 3GPP Draft, 3GPP TSG RAN WG1 Meeting #97, R1-1906798, Intel—EV2X COEX, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728249, 8 pages, paragraphs [00 1.] , [003.] , [03.1], [004.] the whole document, sections 1-4.

(Continued)

*Primary Examiner* — Angel T Brockman
(74) *Attorney, Agent, or Firm* — Harrity & Harrity LLP / Qualcomm

(57) ABSTRACT

Various aspects of the present disclosure generally relate to wireless communication. In some aspects, a first user equipment (UE) may identify a first set of resources for an access link communication between the first UE and a base station. The UE may identify a second set of resources for a sidelink communication between the first UE and a second UE. The UE may identify a scheduling conflict between the first set of resources for the access link communication and the second set of resources for the sidelink communication. The UE may drop at least a portion of the first set of resources for the access link communication or the second set of resources for the sidelink communication based at least in part on the identification of the scheduling conflict and a prioritization rule. Numerous other aspects are provided.

30 Claims, 11 Drawing Sheets

Related U.S. Application Data

(60) Provisional application No. 62/880,888, filed on Jul. 31, 2019.

(58) Field of Classification Search
USPC .......................................................... 370/330
See application file for complete search history.

(56) References Cited

OTHER PUBLICATIONS

International Search Report and Written Opinion—PCT/US2020/044456—ISA/EPO—dated Oct. 5, 2020.
Qualcomm Incorporated: "Co-existence Aspects for NR-V2X and LTE-V2X," 3GPP Draft, 3GPP TSG RAN WG1 Meeting #96bis, R1-1905011_Co-Existence Aspects for NR-V2X and LTE-V2X, 3rd Generation Partnership Project (3GPP), Mobile Competence Centre, 650, Route Des Lucioles, F-06921, Sophia-Antipolis Cedex, France, vol. RAN WG1. No. Xi 'an. China, Apr. 8, 2019-Apr. 12, 2019, Apr. 7, 2019 (Apr. 7, 2019), XP051700126, pp. 1-4, sections 1-3.
Qualcomm Incorporated: "Summary of In-device Coexistence Aspects in NR-V2X (AI 7.2.4.4) ," 3GPP Draft, 3GPP TSG RAN WG1 Meeting #97, R1-1907720, Summary NR V2X-AI7.2.4.4-Coexistence, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 17, 2019 (May 17, 2019), XP051740000, 7 pages, sections 1-3.
Taiwan Search Report—TW109125976—TIPO—dated Aug. 15, 2023.

\* cited by examiner

TECHNIQUES FOR HANDLING SCHEDULING CONFLICTS BETWEEN ACCESS LINK COMMUNICATIONS AND SIDELINK COMMUNICATIONS

CROSS-REFERENCE TO RELATED APPLICATION

This application is a continuation of U.S. patent application Ser. No. 16/943,346, filed Jul. 30, 2020, entitled "TECHNIQUES FOR HANDLING SCHEDULING CONFLICTS BETWEEN ACCESS LINK COMMUNICATIONS AND SIDELINK COMMUNICATIONS," which claims priority to U.S. Provisional Patent Application No. 62/880,888, filed on Jul. 31, 2019, entitled "TECHNIQUES FOR HANDLING SCHEDULING CONFLICTS BETWEEN ACCESS LINK COMMUNICATIONS AND SIDELINK COMMUNICATIONS," the contents of which are incorporated herein by reference in their entireties.

FIELD OF THE DISCLOSURE

Aspects of the present disclosure generally relate to wireless communication and to techniques and apparatuses for handling scheduling conflicts between access link communications and sidelink communications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first user equipment (UE), may include identifying a first set of resources for an access link communication between the first UE and a base station; identifying a second set of resources for a sidelink communication between the first UE and a second UE; identifying a scheduling conflict between the first set of resources for the access link communication and the second set of resources for the sidelink communication; and dropping at least a portion of the first set of resources for the access link communication or the second set of resources for the sidelink communication based at least in part on the identification of the scheduling conflict and a prioritization rule.

In some aspects, the prioritization rule indicates that access link communications have a higher priority than sidelink communications.

In some aspects, the dropping comprises dropping at least a portion of the second set of resources for the sidelink communication based at least in part on the prioritization rule.

In some aspects, the dropping is further based at least in part on a capability of the first UE.

In some aspects, the capability indicates whether the first UE is capable of transmitting or receiving multiple communications scheduled in a same set of resources.

In some aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In some aspects, the dropping comprises dropping a subset of sidelink communications scheduled for the first UE to permit the first UE to receive the access link communication.

In some aspects, the sidelink communication is a transmission from the second UE to the first UE, and the access link communication is one of an uplink communication or a downlink communication.

In some aspects, the first UE is configured to transmit a negative acknowledgement (NACK) corresponding to the transmissions, and the NACK is transmitted in connection with an indication that the NACK is due to the scheduling conflict.

In some aspects, the first UE is configured to receive an indication that multiple transmissions, including the transmission, have been dropped; and refrain from monitoring for the multiple transmissions based at least in part on the indication.

In some aspects, the indication that the multiple transmissions have been dropped is received from at least one of the base station or the second UE.

In some aspects, the sidelink communication is a transmission from the first UE to the second UE, and the access link communication is one of an uplink communication or a downlink communication.

In some aspects, the transmission is dropped and a NACK corresponding to the transmission is not counted, for a procedure that modifies transmissions due to poor channel conditions, based at least in part on dropping the transmission.

In some aspects, the transmission is dropped, and the first UE is configured to transmit an indication to the second UE that multiple transmissions, including the transmission, have been dropped.

In some aspects, the sidelink communication is a physical sidelink control channel communication, the access link communication is one of a physical downlink control channel communication or a physical uplink control channel communication, and the scheduling conflict is identified based at least in part on a radio resource control message.

In some aspects, the sidelink communication is a physical sidelink shared channel communication, the access link communication is one of a physical downlink shared channel communication or a physical uplink shared channel communication, and the scheduling conflict is identified based at least in part on at least one of sidelink control information or downlink control information.

In some aspects, the second set of resources is identified based at least in part on one or more resources in which the first UE is to perform discontinuous reception or sidelink communication skipping for sidelink communications.

In some aspects, the first UE is configured to transmit an indication of the one or more resources to at least one of the base station or the second UE.

In some aspects, a method of wireless communication, performed by a base station, may include identifying a first set of resources for an access link communication between the base station and a first UE; identifying a second set of resources for a sidelink communication between the first UE and a second UE; and identifying a scheduling conflict between the first set of resources for the access link communication and the second set of resources for the sidelink communication based at least in part on a capability of the first UE.

In some aspects, the method includes refraining from scheduling at least a portion of the first set of resources for the access link communication based at least in part on the identification of the scheduling conflict and a prioritization rule.

In some aspects, the second set of resources is identified based at least in part on a sidelink resource pool configured by the base station for the first UE.

In some aspects, the sidelink resource pool is for sidelink reception.

In some aspects, refraining from scheduling at least a portion of the first set of resources comprises refraining from scheduling the access link communication in any resource included in the sidelink resource pool.

In some aspects, the capability indicates whether the first UE is capable of transmitting or receiving multiple communications scheduled in a same set of resources.

In some aspects, the capability indicates whether the first UE is capable of transmitting or receiving multiple communications scheduled in a same set of resources.

In some aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In some aspects, the second set of resources is identified from SCI transmitted from the second UE to the first UE.

In some aspects, a timing value, indicated in the SCI for timing between the SCI and a corresponding sidelink data communication, satisfies a threshold.

In some aspects, the first UE and the second UE are connected to the base station.

In some aspects, the first UE is connected to the base station and the second UE is connected to another base station, and the base station is configured to receive a sidelink configuration of the second UE directly or indirectly from the other base station.

In some aspects, the second set of resources is identified based at least in part on one or more resources in which the first UE is to perform discontinuous reception or sidelink communication skipping for sidelink communications.

In some aspects, the one or more resources are indicated in a message received from at least one of the first UE or the second UE.

In some aspects, the message is received from the first UE and the base station is configured to relay the message to the second UE.

In some aspects, the one or more resources are configured by the base station and indicated to at least one of the first UE or the second UE.

In some aspects, a first UE for wireless communication may include memory and one or more processors operatively coupled to the memory. The memory and the one or more processors may be configured to identify a first set of resources for an access link communication between the first UE and a base station; identify a second set of resources for a sidelink communication between the first UE and a second UE; identify a scheduling conflict between the first set of resources for the access link communication and the second set of resources for the sidelink communication; and drop at least a portion of the first set of resources for the access link communication or the second set of resources for the sidelink communication based at least in part on the identification of the scheduling conflict and a prioritization rule.

In some aspects, the prioritization rule indicates that access link communications have a higher priority than sidelink communications.

In some aspects, the dropping comprises dropping at least a portion of the second set of resources for the sidelink communication based at least in part on the prioritization rule.

In some aspects, the dropping is further based at least in part on a capability of the first UE.

In some aspects, the capability indicates whether the first UE is capable of transmitting or receiving multiple communications scheduled in a same set of resources.

In some aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In some aspects, the dropping comprises dropping a subset of sidelink communications scheduled for the first UE to permit the first UE to receive the access link communication.

In some aspects, the sidelink communication is a transmission from the second UE to the first UE, and the access link communication is one of an uplink communication or a downlink communication.

In some aspects, the first UE is configured to transmit a NACK corresponding to the transmissions, and the NACK is transmitted in connection with an indication that the NACK is due to the scheduling conflict.

In some aspects, the first UE is configured to receive an indication that multiple transmissions, including the transmission, have been dropped; and refrain from monitoring for the multiple transmissions based at least in part on the indication.

In some aspects, the indication that the multiple transmissions have been dropped is received from at least one of the base station or the second UE.

In some aspects, the sidelink communication is a transmission from the first UE to the second UE, and the access link communication is one of an uplink communication or a downlink communication.

In some aspects, the transmission is dropped and a NACK corresponding to the transmission is not counted, for a procedure that modifies transmissions due to poor channel conditions, based at least in part on dropping the transmission.

In some aspects, the transmission is dropped, and the first UE is configured to transmit an indication to the second UE that multiple transmissions, including the transmission, have been dropped.

In some aspects, the sidelink communication is a physical sidelink control channel communication and the access link communication is one of a physical downlink control channel communication or a physical uplink control channel communication, and the scheduling conflict is identified based at least in part on a radio resource control message.

In some aspects, the sidelink communication is a physical sidelink shared channel communication and the access link communication is one of a physical downlink shared channel communication or a physical uplink shared channel communication, and the scheduling conflict is identified based at least in part on at least one of sidelink control information or downlink control information.

In some aspects, the second set of resources is identified based at least in part on one or more resources in which the first UE is to perform discontinuous reception or sidelink communication skipping for sidelink communications.

In some aspects, the first UE is configured to transmit an indication of the one or more resources to at least one of the base station or the second UE.

In some aspects, a base station for wireless communication may include memory and one or more processors operatively coupled to the memory. The memory and the one or more processors may be configured to identify a first set of resources for an access link communication between the base station and a first UE; identify a second set of resources for a sidelink communication between the first UE and a second UE; and identify a scheduling conflict between the first set of resources for the access link communication and the second set of resources for the sidelink communication based at least in part on a capability of the first UE.

In some aspects, the base station is configured to refrain from scheduling at least a portion of the first set of resources for the access link communication based at least in part on the identification of the scheduling conflict and a prioritization rule.

In some aspects, the second set of resources is identified based at least in part on a sidelink resource pool configured by the base station for the first UE.

In some aspects, the sidelink resource pool is for sidelink reception.

In some aspects, refraining from scheduling at least a portion of the first set of resources comprises refraining from scheduling the access link communication in any resource included in the sidelink resource pool.

In some aspects, the capability indicates whether the first UE is capable of transmitting or receiving multiple communications scheduled in a same set of resources.

In some aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In some aspects, the second set of resources is identified from SCI transmitted from the second UE to the first UE.

In some aspects, a timing value, indicated in the SCI for timing between the SCI and a corresponding sidelink data communication, satisfies a threshold.

In some aspects, the first UE and the second UE are connected to the base station.

In some aspects, the first UE is connected to the base station and the second UE is connected to another base station, and the base station is configured to receive a sidelink configuration of the second UE directly or indirectly from the other base station.

In some aspects, the second set of resources is identified based at least in part on one or more resources in which the first UE is to perform discontinuous reception or sidelink communication skipping for sidelink communications.

In some aspects, the one or more resources are indicated in a message received from at least one of the first UE or the second UE.

In some aspects, the message is received from the first UE and the base station is configured to relay the message to the second UE.

In some aspects, the one or more resources are configured by the base station and indicated to at least one of the first UE or the second UE.

In some aspects, a non-transitory computer-readable medium may store one or more instructions for wireless communication. The one or more instructions, when executed by one or more processors of a first UE, may cause the one or more processors to: identify a first set of resources for an access link communication between the first UE and a base station; identify a second set of resources for a sidelink communication between the first UE and a second UE; identify a scheduling conflict between the first set of resources for the access link communication and the second set of resources for the sidelink communication; and drop at least a portion of the first set of resources for the access link communication or the second set of resources for the sidelink communication based at least in part on the identification of the scheduling conflict and a prioritization rule.

In some aspects, the prioritization rule indicates that access link communications have a higher priority than sidelink communications.

In some aspects, the dropping comprises dropping at least a portion of the second set of resources for the sidelink communication based at least in part on the prioritization rule.

In some aspects, the dropping is further based at least in part on a capability of the first UE.

In some aspects, the capability indicates whether the first UE is capable of transmitting or receiving multiple communications scheduled in a same set of resources.

In some aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In some aspects, the dropping comprises dropping a subset of sidelink communications scheduled for the first UE to permit the first UE to receive the access link communication.

In some aspects, the sidelink communication is a transmission from the second UE to the first UE, and the access link communication is one of an uplink communication or a downlink communication.

In some aspects, the first UE is configured to transmit a NACK corresponding to the transmissions, and the NACK is transmitted in connection with an indication that the NACK is due to the scheduling conflict.

In some aspects, the first UE is configured to receive an indication that multiple transmissions, including the transmission, have been dropped; and refrain from monitoring for the multiple transmissions based at least in part on the indication.

In some aspects, the indication that the multiple transmissions have been dropped is received from at least one of the base station or the second UE.

In some aspects, the sidelink communication is a transmission from the first UE to the second UE, and the access link communication is one of an uplink communication or a downlink communication.

In some aspects, the transmission is dropped and a NACK corresponding to the transmission is not counted, for a procedure that modifies transmissions due to poor channel conditions, based at least in part on dropping the transmission.

In some aspects, the transmission is dropped, and the first UE is configured to transmit an indication to the second UE that multiple transmissions, including the transmission, have been dropped.

In some aspects, the sidelink communication is a physical sidelink control channel communication and the access link communication is one of a physical downlink control channel communication or a physical uplink control channel communication, and the scheduling conflict is identified based at least in part on a radio resource control message.

In some aspects, the sidelink communication is a physical sidelink shared channel communication and the access link communication is one of a physical downlink shared channel communication or a physical uplink shared channel communication, and the scheduling conflict is identified based at least in part on at least one of sidelink control information or downlink control information.

In some aspects, the second set of resources is identified based at least in part on one or more resources in which the first UE is to perform discontinuous reception or sidelink communication skipping for sidelink communications.

In some aspects, the first UE is configured to transmit an indication of the one or more resources to at least one of the base station or the second UE.

In some aspects, a non-transitory computer-readable medium may store one or more instructions for wireless communication. The one or more instructions, when executed by one or more processors of a base station, may cause the one or more processors to: identify a first set of resources for an access link communication between the base station and a first UE; identify a second set of resources for a sidelink communication between the first UE and a second UE; and identify a scheduling conflict between the first set of resources for the access link communication and the second set of resources for the sidelink communication based at least in part on a capability of the first UE.

In some aspects, the one or more instructions cause the base station to refrain from scheduling at least a portion of the first set of resources for the access link communication based at least in part on the identification of the scheduling conflict and a prioritization rule.

In some aspects, the second set of resources is identified based at least in part on a sidelink resource pool configured by the base station for the first UE.

In some aspects, the sidelink resource pool is for sidelink reception.

In some aspects, refraining from scheduling at least a portion of the first set of resources comprises refraining from scheduling the access link communication in any resource included in the sidelink resource pool.

In some aspects, the capability indicates whether the first UE is capable of transmitting or receiving multiple communications scheduled in a same set of resources.

In some aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In some aspects, the second set of resources is identified from SCI transmitted from the second UE to the first UE.

In some aspects, a timing value, indicated in the SCI for timing between the SCI and a corresponding sidelink data communication, satisfies a threshold.

In some aspects, the first UE and the second UE are connected to the base station.

In some aspects, the first UE is connected to the base station and the second UE is connected to another base station, and the base station is configured to receive a sidelink configuration of the second UE directly or indirectly from the other base station.

In some aspects, the second set of resources is identified based at least in part on one or more resources in which the first UE is to perform discontinuous reception or sidelink communication skipping for sidelink communications.

In some aspects, the one or more resources are indicated in a message received from at least one of the first UE or the second UE.

In some aspects, the message is received from the first UE and the base station is configured to relay the message to the second UE.

In some aspects, the one or more resources are configured by the base station and indicated to at least one of the first UE or the second UE.

In some aspects, a first apparatus for wireless communication may include means for identifying a first set of resources for an access link communication between the first apparatus and a base station; means for identifying a second set of resources for a sidelink communication between the first apparatus and a second apparatus; means for identifying a scheduling conflict between the first set of resources for the access link communication and the second set of resources for the sidelink communication; and means for dropping at least a portion of the first set of resources for the access link communication or the second set of resources for the sidelink communication based at least in part on the identification of the scheduling conflict and a prioritization rule.

In some aspects, the prioritization rule indicates that access link communications have a higher priority than sidelink communications.

In some aspects, the dropping comprises dropping at least a portion of the second set of resources for the sidelink communication based at least in part on the prioritization rule.

In some aspects, the dropping is further based at least in part on a capability of the first apparatus.

In some aspects, the capability indicates whether the first apparatus is capable of transmitting or receiving multiple communications scheduled in a same set of resources.

In some aspects, the capability indicates at least one of: a maximum bandwidth, a maximum data rate, or a maximum rank supported by the first apparatus for access link communications; a maximum bandwidth, a maximum data rate, or a maximum rank supported by the first apparatus for sidelink communications; a maximum bandwidth, a maximum data rate, or a maximum rank supported by the first apparatus for joint access link and sidelink communications scheduled in a same set of resources; whether the first apparatus is capable of communicating using multiple beams; whether the first apparatus is capable of communicating in a half duplex mode or a full duplex mode; or a combination thereof.

In some aspects, the dropping comprises dropping a subset of sidelink communications scheduled for the first apparatus to permit the first apparatus to receive the access link communication.

In some aspects, the sidelink communication is a transmission from the second apparatus to the first apparatus, and the access link communication is one of an uplink communication or a downlink communication.

In some aspects, the first apparatus is configured to transmit a NACK corresponding to the transmissions, and the NACK is transmitted in connection with an indication that the NACK is due to the scheduling conflict.

In some aspects, the first apparatus is configured to receive an indication that multiple transmissions, including the transmission, have been dropped; and refrain from monitoring for the multiple transmissions based at least in part on the indication.

In some aspects, the indication that the multiple transmissions have been dropped is received from at least one of the base station or the second apparatus.

In some aspects, the sidelink communication is a transmission from the first apparatus to the second apparatus, and the access link communication is one of an uplink communication or a downlink communication.

In some aspects, the transmission is dropped and a NACK corresponding to the transmission is not counted, for a procedure that modifies transmissions due to poor channel conditions, based at least in part on dropping the transmission.

In some aspects, the transmission is dropped, and the first apparatus is configured to transmit an indication to the second apparatus that multiple transmissions, including the transmission, have been dropped.

In some aspects, the sidelink communication is a physical sidelink control channel communication and the access link communication is one of a physical downlink control channel communication or a physical uplink control channel communication, and the scheduling conflict is identified based at least in part on a radio resource control message.

In some aspects, the sidelink communication is a physical sidelink shared channel communication and the access link communication is one of a physical downlink shared channel communication or a physical uplink shared channel communication, and the scheduling conflict is identified based at least in part on at least one of sidelink control information or downlink control information.

In some aspects, the second set of resources is identified based at least in part on one or more resources in which the first apparatus is to perform discontinuous reception or sidelink communication skipping for sidelink communications.

In some aspects, the first apparatus is configured to transmit an indication of the one or more resources to at least one of the base station or the second apparatus.

In some aspects, an apparatus for wireless communication may include means for identifying a first set of resources for an access link communication between the apparatus and a first UE; means for identifying a second set of resources for a sidelink communication between the first UE and a second UE; and means for identifying a scheduling conflict between the first set of resources for the access link communication and the second set of resources for the sidelink communication based at least in part on a capability of the first UE.

In some aspects, the apparatus includes means for refraining from scheduling at least a portion of the first set of resources for the access link communication based at least in part on the identification of the scheduling conflict and a prioritization rule.

In some aspects, the second set of resources is identified based at least in part on a sidelink resource pool configured by the apparatus for the first UE.

In some aspects, the sidelink resource pool is for sidelink reception.

In some aspects, refraining from scheduling at least a portion of the first set of resources comprises refraining from scheduling the access link communication in any resource included in the sidelink resource pool.

In some aspects, the capability indicates whether the first apparatus is capable of transmitting or receiving multiple communications scheduled in a same set of resources.

In some aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In some aspects, the second set of resources is identified from SCI transmitted from the second UE to the first UE.

In some aspects, a timing value, indicated in the SCI for timing between the SCI and a corresponding sidelink data communication, satisfies a threshold.

In some aspects, the first UE and the second UE are connected to the apparatus.

In some aspects, the first UE is connected to the apparatus and the second UE is connected to another apparatus, and the apparatus is configured to receive a sidelink configuration of the second UE directly or indirectly from the other apparatus.

In some aspects, the second set of resources is identified based at least in part on one or more resources in which the first UE is to perform discontinuous reception or sidelink communication skipping for sidelink communications.

In some aspects, the one or more resources are indicated in a message received from at least one of the first UE or the second UE.

In some aspects, the message is received from the first UE and the apparatus is configured to relay the message to the second UE.

In some aspects, the one or more resources are configured by the apparatus and indicated to at least one of the first UE or the second UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
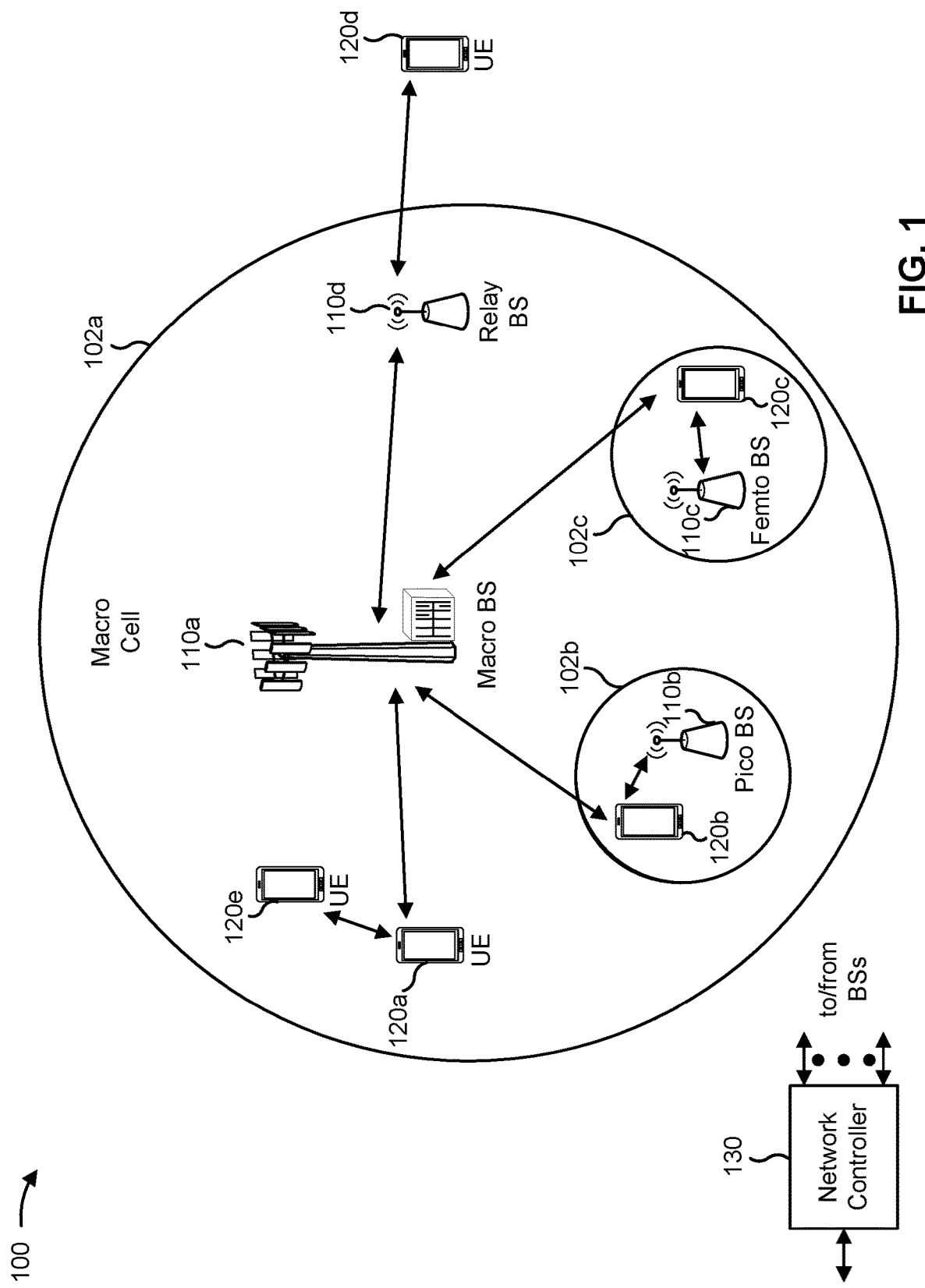
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. In some aspects, a UE 120 may operate in a transmission mode where resource selection and/or scheduling is performed by the base station 110. In some aspects, a UE 120 may operate in a transmission mode where resource selection and/or scheduling is performed by the UE 120. Additional details regarding sidelink communications are described below in connection with FIG. 3.

As indicated above, FIG. 1 is provided as an example. Other examples may differ from what is described with regard to FIG. 1.

Figure 2:
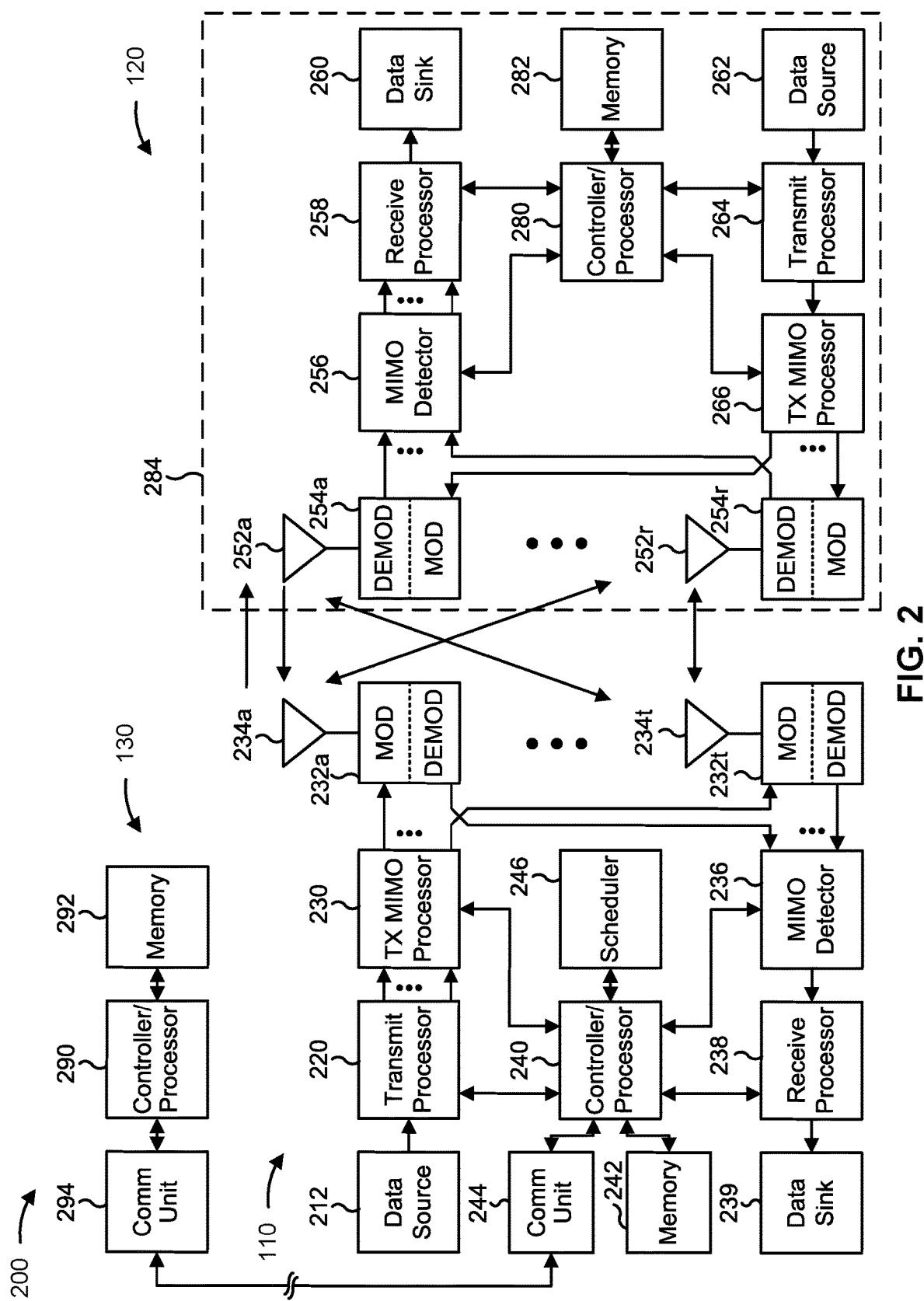
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with handling scheduling conflicts between access link communications and sidelink communications, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, a first UE (e.g., a UE 120) may include means for identifying (e.g., using receive processor 258, transmit processor 264, controller/processor 280, memory 282, identification component 1006, and/or the like) a first set of resources for an access link communication between the first UE and a base station; means for identifying (e.g., using receive processor 258, transmit processor 264, controller/processor 280, memory 282, identification component 1006, and/or the like) a second set of resources for a sidelink communication between the first UE and a second UE; means for identifying (e.g., using receive processor 258, transmit processor 264, controller/processor 280, memory 282, identification component 1006, and/or the like) a scheduling conflict between the first set of resources for the access link communication and the second set of resources for the sidelink communication; means for dropping (e.g., using receive processor 258, transmit processor 264, controller/processor 280, memory 282, dropping component 1008, and/or the like) at least a portion of the first set of resources for the access link communication or the second set of resources for the sidelink communication based at least in part on the identification of the scheduling conflict and a prioritization rule; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for identifying (e.g., using transmit processor 220, receive processor 238, controller/processor 240, memory 242, scheduler 246, identification component 1106, and/or the like) a first set of resources for an access link communication between the base station 110 and a first UE; means for identifying (e.g., using transmit processor 220, receive processor 238, controller/processor 240, memory 242, scheduler 246, identification component 1106, and/or the like) a second set of resources for a sidelink communication between the first UE and a second UE; means for identifying (e.g., using transmit processor 220, receive processor 238, controller/processor 240, memory 242, scheduler 246, identification component 1106, and/or the like) a scheduling conflict between the first set of resources for the access link communication and the second set of resources for the sidelink communication based at least in part on a capability of the first UE; means for refraining from scheduling (e.g., using transmit processor 220, receive processor 238, controller/processor 240, memory 242, scheduler 246, scheduling component 1108, and/or the like) at least a portion of the first set of resources for the access link communication based at least in part on the identification of the scheduling conflict and a prioritization rule; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
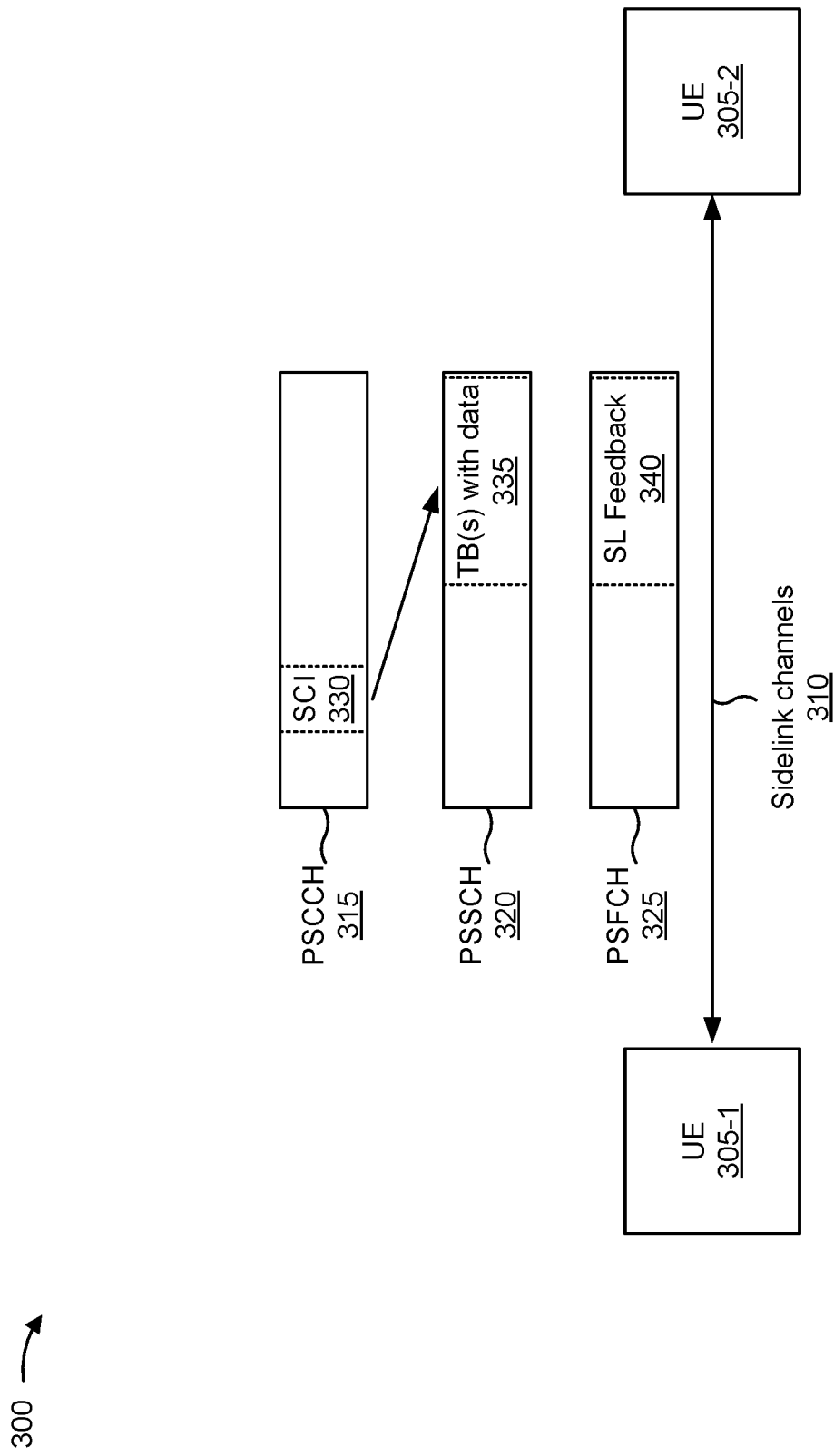
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the sidelink channel 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for communications with a base station 110 via an access link or an access channel. The PSSCH 320 may be used to communicate data, similar to a physical downlink shared channel (PDSCH) and/or a physical uplink shared channel (PUSCH) used for communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 that includes data is carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), channel state information (CSI), a scheduling request (SR), and/or the like.

In some aspects, the sidelink channel 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
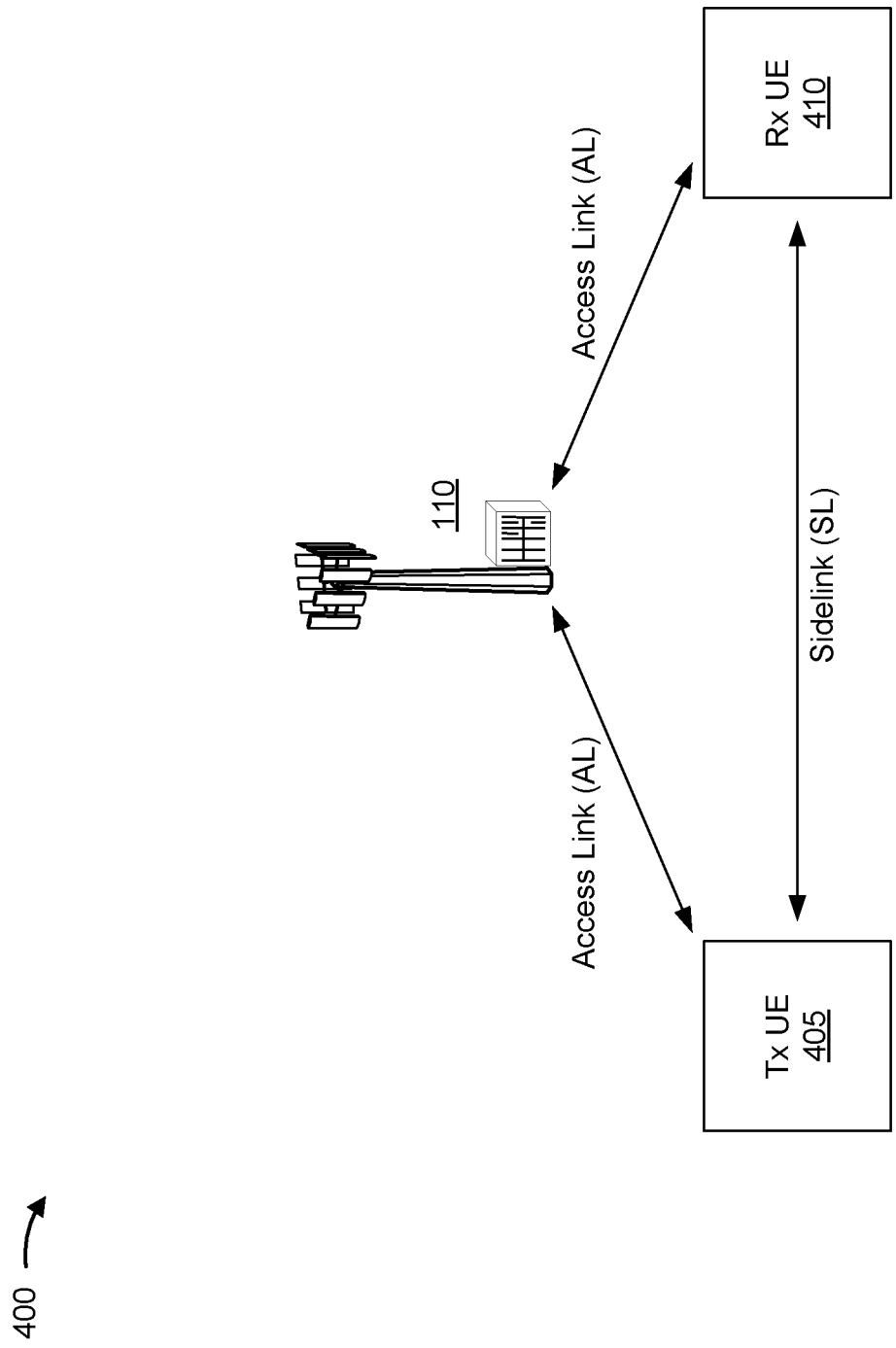
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, a base station 110 may communicate with the Tx UE 405 via a first access link. Additionally, or alternatively, the base station 110 may communicate with the Rx UE 410 via a second access link. The Tx UE 405 and/or the Rx UE 410 may correspond to one or more UEs described elsewhere herein, such as the UE 120 of FIG. 1. Thus, "sidelink" may refer to a direct link between UEs 120, and "access link" may refer to a direct link between a base station 110 and a UE 120. Sidelink communications may be transmitted via the sidelink and access link communications may be transmitted via the access link. An access link communication may be either a downlink communication (from a base station 110 to a UE 120) or an uplink communication (from a UE 120 to a base station 110).

A UE 120 may support various capabilities for communicating via an access link. For example, the UE 120 may be capable of communicating up to a maximum data rate on the access link, may be capable of communicating using up to a maximum bandwidth on the access link, and/or the like. The UE 120 may indicate such capabilities to a base station 110 using a UE capability report (e.g., as part of a radio resource control (RRC) configuration procedure). The base station 110 may use the indicated UE capabilities to schedule, generate, and/or encode communications for the UE 120, such as by sending grants and/or other communications that conform with the indicated UE capabilities. In some cases, if a grant does not conform with the capabilities of a UE 120 (e.g., if the grant schedules a communication that does not conform with the capabilities of the UE 120), then the UE 120 may ignore the grant and/or a corresponding communication scheduled by the grant.

Similarly, a UE 120 may support various capabilities for communicating via a sidelink. For example, the UE 120 may be capable of communicating up to a maximum data rate on the sidelink, may be capable of communicating using up to a maximum bandwidth on the sidelink, and/or the like. The UE 120 may also support a joint capability for access link communications and sidelink communications in the same resources (e.g., the same time domain resources). In some cases, a joint capability may be different from a corresponding capability for either the access link or the sidelink. For example, because processing communications on two separate links (e.g., an access link and a sidelink) requires additional overhead as compared to processing a communication on a single link, a joint maximum data rate for the access link and the sidelink may be less than an individual maximum data rate for the access link and/or an individual maximum data rate for the sidelink.

In some sidelink communication modes, such as an autonomous scheduling mode where resource selection and/or scheduling is performed by a UE 120 (e.g., which may include transmission mode 2 and/or transmission mode 4), a base station 110 may not receive information regarding sidelink communications between UEs 120. As a result, the base station 110 may transmit a grant and/or schedule a communication that conforms to an access link capability of a UE 120, but that violates a joint access link and sidelink capability of the UE 120. For example, the base station 110 may schedule a communication using a data rate that is less than or equal to a maximum data rate supported by the UE 120 for access link communications, but that is greater than a joint maximum data rate supported by the UE 120 for joint access link communications and sidelink communications (e.g., scheduled in the same slot). In this case, the UE 120 may be incapable of receiving both an access link communication and a sidelink communication that are scheduled in the same resources, may ignore the grant from the base station 110, and/or the like. As a result, latency may be increased, reliability may be reduced, performance may be degraded, network resources may be wasted (e.g., for retransmission of a failed communication), and/or resources of the base station 110 and/or the UE 120 (e.g., processing resources, memory resources, battery power, and/or the like) may be wasted (e.g., for handling retransmissions).

Some techniques and apparatuses described herein permit conformance with access link capabilities, sidelink capabilities, and/or joint capabilities. Furthermore, some techniques and apparatuses described herein provide mechanisms for handling scheduling conflicts or potential scheduling conflicts between access link communications and sidelink communications to avoid violating a UE capability. In this way, latency may be reduced, reliability may be increased, performance may be improved, network resources may be conserved, and/or resources of the base station 110 and/or the UE 120 may be conserved.

As indicated above, FIG. 4 is provided as an example. Other examples may differ from what is described with respect to FIG. 4.

Figure 5:
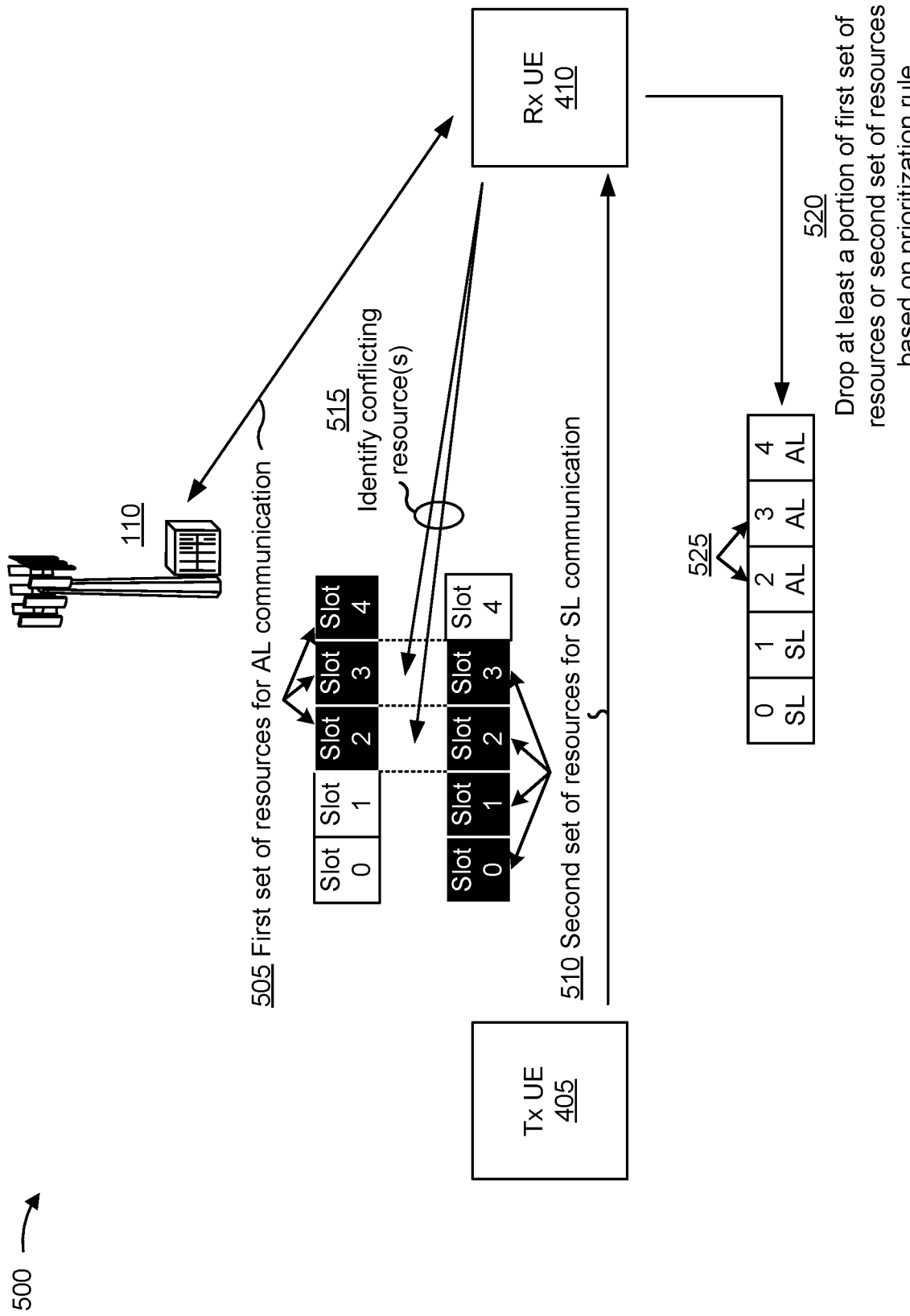
FIGS. 5-7 are diagrams illustrating examples of handling scheduling conflicts between access link communications and sidelink communications, in accordance with various aspects of the present disclosure.

FIG. 5 is a diagram illustrating an example 500 of handling scheduling conflicts between access link communications and sidelink communications, in accordance with various aspects of the present disclosure.

As shown in FIG. 5, a Tx UE 405 and an Rx UE 410 may communicate with one another via a sidelink, and the Rx UE 410 may communicate with a base station 110 via an access link. The Tx UE 405 and/or the Rx UE 410 may correspond to one or more UEs described elsewhere herein, such as the UE 120 of FIG. 1, the UE 305-1 of FIG. 3, the UE 305-2 of FIG. 3, and/or the like.

As shown by reference number 505, the Rx UE 410 may identify a first set of resources for an access link communication between the Rx UE 410 and the base station 110. For example, the first set of resources may be indicated in a radio resource control (RRC) message from the base station 110 (e.g., for semi-statically scheduled resources, such as for semi-persistent scheduling (SPS), configured grants (CGs), PDCCH communications, and/or the like), may be indicated in downlink control information (DCI) from the base station 110 (e.g., for communications scheduled via a PDCCH, for PDSCH communications, and/or the like), and/or the like. The first set of resources may include one or more resources (e.g., time domain resources, frequency domain resources, spatial domain resources, and/or the like) to be used for an access link communication on the access link. The access link communication between the Rx UE 410 and the base station 110 may include an uplink communication or a downlink communication.

As shown by reference number 510, the Rx UE 410 may identify a second set of resources for a sidelink communication between the Tx UE 405 and the Rx UE 410. For example, the second set of resources may be indicated in sidelink control information (SCI) from the Tx UE 405 (e.g., for communications scheduled via a PSCCH). The second set of resources may include one or more resources (e.g., time domain resources, frequency domain resources, spatial domain resources, and/or the like) to be used for a sidelink communication on the sidelink. In some aspects, the second set of resources may exclude one or more resources to be used by the Rx UE 410 for discontinuous reception (DRX) and/or sidelink communication skipping (e.g., one or more resources for which the Rx UE 410 indicates that the Rx UE 410 will not monitor). As shown, the sidelink communication between the Tx UE 405 and the Rx UE 410 may include a transmission from the Tx UE 405 to the Rx UE 410.

As shown by reference number 515, the Rx UE 410 may identify a scheduling conflict between the first set of resources for the access link communication and the second set of resources for the sidelink communication. In example 500, slots 2, 3, and 4 are included in the first set of resources for the access link communication, and slots 0, 1, 2, and 3 are included in the second set of resources for the sidelink communication. In this example, the Rx UE 410 identifies a scheduling conflict in slots 2 and 3 because the access link communication and the sidelink communication are both scheduled in slots 2 and 3 (e.g., slots 2 and 3 are included in both the first set of resources and the second set of resources). In some cases, access link communications and/or sidelink communications may be scheduled in a subset of time resources (e.g., OFDM symbols) within a slot. In these cases, a scheduling conflict may occur for a slot if a first subset of time resources scheduled for an access link communication in the slot overlaps in time with a second subset of time resources scheduled for a sidelink communication in the slot.

In some aspects, the access link communication is a PDCCH communication or a PUCCH communication. In this case, the Rx UE 410 may identify the scheduling conflict based at least in part on an RRC message, which may configure resources for the PDCCH and/or the PUCCH. In some aspects, the access link communication is a PDSCH communication or a PUSCH communication. In this case, the Rx UE 410 may identify the scheduling conflict based at least in part on DCI (or an RRC message for SPS or CG), which may schedule resources for the PDSCH and/or the PUSCH. In some aspects, the access link communication is a channel state information reference signal (CSI-RS), a sounding reference signal (SRS), or another type of reference signal. In this case, the Rx UE 410 may identify the scheduling conflict based at least in part on a message that schedules the access link communication (e.g., the reference signal), such as an RRC message, a medium access control (MAC) control element (CE) (MAC-CE), DCI, and/or the like. In some aspects, the sidelink communication is a PSCCH communication. In this case, the Rx UE 410 may identify the scheduling conflict based at least in part on an RRC message, which may indicate a set of monitoring occasions (e.g., resources) for the PSCCH. In some aspects, the sidelink communication is a PSSCH. In this case, the Rx UE 410 may identify the scheduling conflict based at least in part on SCI, which may schedule resources for the PSSCH (e.g., from a set of possible locations configured in an RRC message).

As shown by reference number 520, the Rx UE 410 may drop at least a portion of the first set of resources for the access link communication or the second set of resources for the sidelink communication based at least in part on the identification of the scheduling conflict and a prioritization rule. The prioritization rule may indicate whether to prioritize access link communications over sidelink communications or whether to prioritize sidelink communications over access link communications. In some aspects, the prioritization rule may differ for different conditions (e.g., different sidelink channel conditions, different access link channel conditions, different quality of services (QoS) requirements associated with an access link communication and/or a sidelink communication, whether the access link communication and/or the sidelink communication carries data or control information, a type of control information carried in the access link communication and/or the sidelink communication, and/or the like).

In example 500, the prioritization rule indicates that access link communications have a higher priority than sidelink communications. In this case, the Rx UE 410 may drop the sidelink communication in slots that are subject to the scheduling conflict. Thus, as shown by reference number 525, the Rx UE 410 may drop the sidelink communication in slots 2 and 3, and may monitor for and/or receive the access link communication (shown as AL) from the base station 110 in slots 2 and 3. In some aspects, the Rx UE 410 may drop a portion of the resources in the second set of resources for the sidelink communication, such as by dropping the sidelink communication in slots 2 and 3 and monitoring for and/or receiving the sidelink communication in slots 0 and 1 (e.g., with a possibility to still be able to decode the sidelink communication). In some aspects, the Rx UE 410 may drop all of the resources in the second set of resources, such as by dropping the sidelink communication in slots 0, 1, 2, and 3.

In some aspects, the Rx UE 410 may determine whether to drop one or more conflicting resources based at least in part on a capability of the Rx UE 410. For example, if the Rx UE 410 is capable of receiving both the access link communication and the sidelink communication in the conflicting resources (e.g., because an access link capability, a sidelink capability, and a joint capability of the Rx UE 410 are not violated in the conflicting resources), then the Rx UE 410 may receive both the sidelink communication and the access link communication in the conflicting resources. However, if the Rx UE 410 is not capable of receiving both the access link communication and the sidelink communication in the conflicting resources (e.g., because at least one of an access link capability, a sidelink capability, or a joint capability of the Rx UE 410 is violated in the conflicting resources), then the Rx UE 410 may drop either the sidelink communication or the access link communication in the conflicting resources based at least in part on the prioritization rule.

In some aspects, the capability of the Rx UE 410 may include a maximum bandwidth, a maximum data rate, and/or a maximum rank supported by the Rx UE 410 for access link communication, sidelink communications, and/or joint communications (e.g., joint communications where access link and sidelink communications are scheduled in a same set of resources). Additionally, or alternatively, the capability of the Rx UE 410 may include whether the Rx UE 410 is capable of communicating using multiple beams (e.g., a first beam for access link communications and a second beam for sidelink communications). Additionally, or alternatively, the capability of the Rx UE 410 may include whether the Rx UE 410 is capable of communicating in a half duplex mode (e.g., permitting only transmission or reception, and not both, at a point in time) or a full duplex mode (e.g., permitting concurrent transmission and reception at a point in time).

In some aspects, the Rx UE 410 may communicate with multiple UEs 120 using sidelink communications. In this case, the prioritization rule may indicate one or more sidelink communications to be dropped and/or one or more sidelink communications to be maintained (e.g., transmitted or received) when a scheduling conflict occurs. For example, a resource may be scheduled for an access link communication, a high priority sidelink communication with a first UE 120, and a low priority sidelink communication with a second UE 120. If the Rx UE 410 is capable of simultaneous communication of two of these communications, then the Rx UE 410 may drop the low priority sidelink communication in the resource and may transmit or receive the high priority sidelink communication (as well as the access link communication) in the resource. Thus, if there are multiple sidelink communications scheduled for a UE 120 (e.g., an Rx UE 410 and/or a Tx UE 405) in a set of conflicting resources, then the UE 120 may drop a subset of the sidelink communications in the set of conflicting resources based at least in part on a UE capability.

In some aspects, the Rx UE 410 may transmit a negative acknowledgment (NACK) based at least in part on dropping a communication. For example, the Rx UE 410 may be scheduled to receive a sidelink transmission from the Tx UE 405, and the Rx UE 410 may drop the sidelink transmission due to a scheduling conflict with an access link communication. Based at least in part on dropping the sidelink transmission, the Rx UE 410 may transmit a NACK, to the Tx UE 405, corresponding to the dropped sidelink transmission. In some aspects, the Rx UE 410 may also transmit an indication that the NACK is due to the scheduling conflict. In this case, because the NACK is due to the scheduling conflict and not due to poor channel conditions, the Tx UE 405 may refrain from counting the NACK for a procedure that modifies transmissions due to poor channel conditions.

By dropping one or more communications in conflicting resources, the Rx UE 410 may avoid violating a UE capability, such as an access link capability, a sidelink capability, and/or a joint capability. Furthermore, by dropping according to a prioritization rule, the Rx UE 410 may ensure that higher priority communications are transmitted or received in the conflicting resources. In this way, latency, reliability, and/or performance may be improved for the higher priority communications.

As indicated above, FIG. 5 is provided as an example. Other examples may differ from what is described with respect to FIG. 5.

Figure 6:
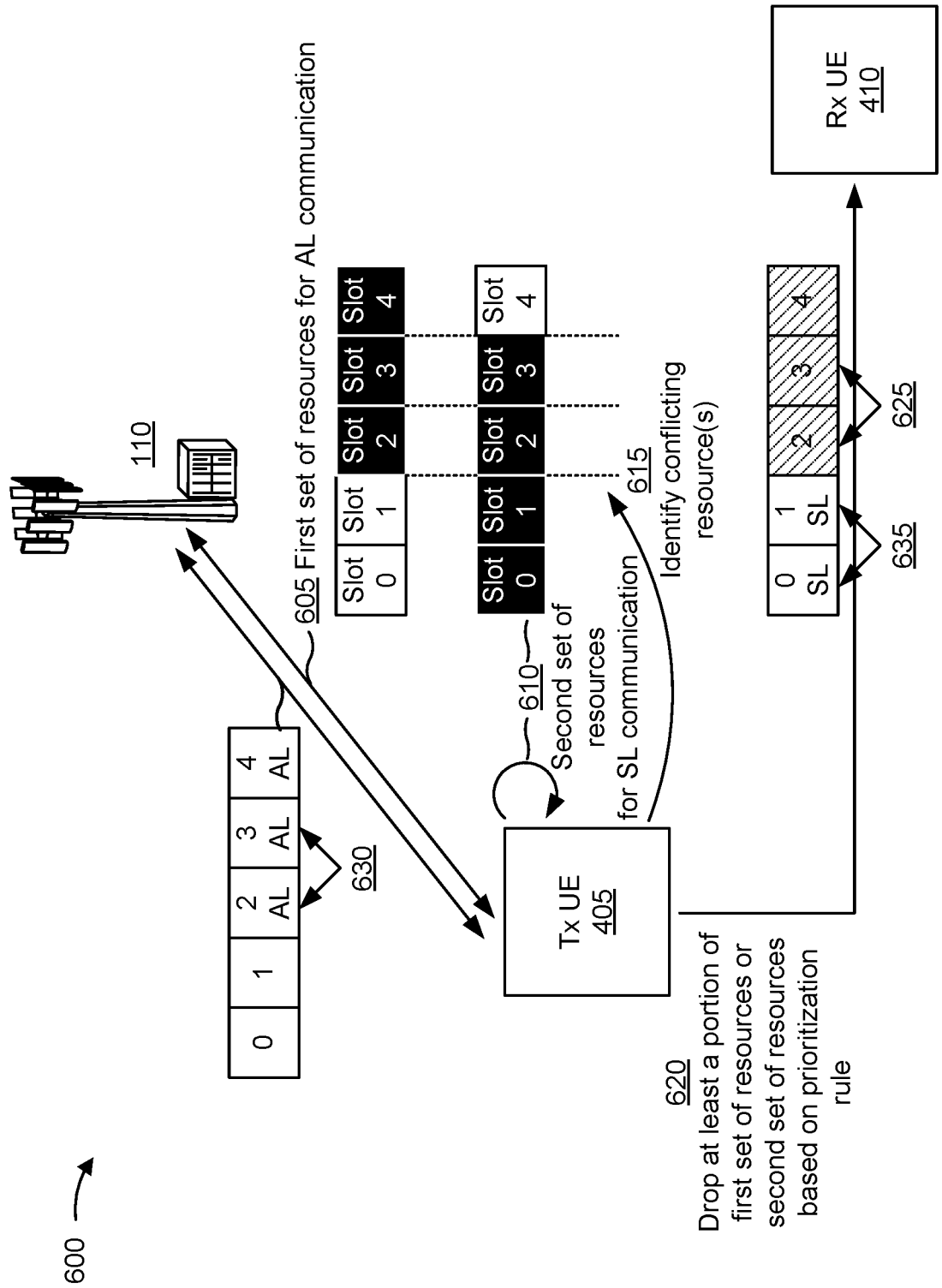

FIG. 6 is a diagram illustrating another example 600 of handling scheduling conflicts between access link communications and sidelink communications, in accordance with various aspects of the present disclosure.

As shown in FIG. 6, a Tx UE 405 and an Rx UE 410 may communicate with one another via a sidelink, and the Tx UE 405 may communicate with a base station 110 via an access link. As indicated above in connection with FIG. 5, the Tx UE 405 and/or the Rx UE 410 may correspond to one or more UEs described elsewhere herein, such as the UE 120 of FIG. 1, the UE 305-1 of FIG. 3, the UE 305-2 of FIG. 3, and/or the like.

As shown by reference number 605, the Tx UE 405 may identify a first set of resources for an access link communication between the Tx UE 405 and the base station 110. As described above in connection with FIG. 5, the first set of resources may be indicated in an RRC message from the base station 110, may be indicated in DCI from the base station 110, and/or the like. The first set of resources may include one or more resources (e.g., time domain resources, frequency domain resources, spatial domain resources, and/or the like) to be used for an access link communication on the access link. The access link communication between the Tx UE 405 and the base station 110 may include an uplink communication or a downlink communication.

As shown by reference number 610, the Tx UE 405 may identify a second set of resources for a sidelink communication between the Tx UE 405 and the Rx UE 410. For example, the second set of resources may be indicated in SCI transmitted by the Tx UE 405 to the Rx UE 410. The second set of resources may include one or more resources (e.g., time domain resources, frequency domain resources, spatial domain resources, and/or the like) to be used for a sidelink communication on the sidelink. In some aspects, the second set of resources may exclude one or more resources to be used by the Rx UE 410 for DRX and/or sidelink communication skipping. As shown, the sidelink communication between the Tx UE 405 and the Rx UE 410 may include a transmission from the Tx UE 405 to the Rx UE 410.

As shown by reference number 615, the Tx UE 405 may identify a scheduling conflict between the first set of resources for the access link communication and the second set of resources for the sidelink communication. In example 600, slots 2, 3, and 4 are included in the first set of resources for the access link communication, and slots 0, 1, 2, and 3 are included in the second set of resources for the sidelink communication. In this example, the Tx UE 405 identifies a scheduling conflict in slots 2 and 3 because the access link communication and the sidelink communication are both scheduled in slots 2 and 3 (e.g., slots 2 and 3 are included in both the first set of resources and the second set of resources).

In some aspects, the access link communication is a PDCCH communication or a PUCCH communication. In this case, the Tx UE 405 may identify the scheduling conflict based at least in part on an RRC message, which may configure resources for the PDCCH and/or the PUCCH. In some aspects, the access link communication is a PDSCH communication or a PUSCH communication. In this case, the Tx UE 405 may identify the scheduling conflict based at least in part on DCI, which may schedule resources for the PDSCH and/or the PUSCH. In some aspects, the access link communication is a CSI-RS, an SRS, or another type of reference signal. In this case, the Tx UE 405 may identify the scheduling conflict based at least in part on a message that schedules the access link communication (e.g., the reference signal), such as an RRC message, a MAC-CE, DCI, and/or the like. In some aspects, the sidelink communication is a PSCCH communication. In this case, the Tx UE 405 may identify the scheduling conflict based at least in part on an RRC message, which may indicate a set of monitoring occasions and/or transmission occasions (e.g., resources) for the PSCCH. In some aspects, the sidelink communication is a PSSCH. In this case, the Tx UE 405 may identify the scheduling conflict based at least in part on SCI, which may schedule resources for the PSSCH (e.g., from a set of possible locations configured in an RRC message).

As shown by reference number 620, the Tx UE 405 may drop at least a portion of the first set of resources for the access link communication or the second set of resources for the sidelink communication based at least in part on the identification of the scheduling conflict and a prioritization rule. The prioritization rule may indicate whether to prioritize access link communications over sidelink communications or whether to prioritize sidelink communications over access link communications. In some aspects, the prioritization rule may differ for different conditions (e.g., different sidelink channel conditions, different access link channel conditions, different QoS requirements associated with an access link communication and/or a sidelink communication, whether the access link communication and/or the sidelink communication carries data or control information, a type of control information carried in the access link communication and/or the sidelink communication, and/or the like).

In example 600, the prioritization rule indicates that access link communications have a higher priority than sidelink communications. In this case, the Tx UE 405 may drop the sidelink communication in slots that are subject to the scheduling conflict. Thus, as shown by reference number 625, the Tx UE 405 may drop the sidelink communication in slots 2 and 3. As shown by reference number 630, the Tx UE 405 may monitor for and/or receive the access link communication (shown as AL) from the base station 110 in slots 2 and 3. In some aspects, the Tx UE 405 may drop a portion of the resources in the second set of resources for the sidelink communication, such as by dropping the sidelink communication in slots 2 and 3 and transmitting the sidelink communication in slots 0 and 1, as shown by reference number 635. In some aspects, the Tx UE 405 may drop all of the resources in the second set of resources, such as by dropping (e.g., refraining from transmitting) the sidelink communication in slots 0, 1, 2, and 3.

In some aspects, the Tx UE 405 may determine whether to drop one or more conflicting resources based at least in part on a capability of the Tx UE 405. For example, if the Tx UE 405 is capable of transmitting the sidelink communication and transmitting or receiving the access link communication in the conflicting resources (e.g., because an access link capability, a sidelink capability, and a joint capability of the Tx UE 405 are not violated in the conflicting resources), then the Tx UE 405 may transmit the sidelink communication and may transmit or receive the access link communication in the conflicting resources. However, if the Tx UE 405 does not have this capability (e.g., because at least one of an access link capability, a sidelink capability, or a joint capability of the Tx UE 405 is violated in the conflicting resources), then the Tx UE 405 may drop either the sidelink communication or the access link communication in the conflicting resources based at least in part on the prioritization rule.

In some aspects, the capability of the Tx UE 405 may include a maximum bandwidth, a maximum data rate, and/or a maximum rank supported by the Tx UE 405 for access link communication, sidelink communications, and/or joint communications (e.g., joint communications where access link and sidelink communications are scheduled in a same set of resources). Additionally, or alternatively, the capability of the Tx UE 405 may include whether the Tx UE 405 is capable of communicating using multiple beams (e.g., a first beam for access link communications and a second beam for sidelink communications). Additionally, or alternatively, the capability of the Tx UE 405 may include whether the Tx UE 405 is capable of communicating in a half duplex mode (e.g., permitting only transmission or reception, and not both, on an antenna at a point in time) or a full duplex mode (e.g., permitting concurrent transmission and reception on an antenna at a point in time).

In some aspects, the Tx UE 405 may communicate with multiple UEs 120 using sidelink communications. In this case, the prioritization rule may indicate one or more sidelink communications to be dropped and/or one or more sidelink communications to be maintained (e.g., transmitted or received) when a scheduling conflict occurs. For example, a resource may be scheduled for an access link communication, a high priority sidelink communication with a first UE 120, and a low priority sidelink communication with a second UE 120. If the Tx UE 405 is capable of simultaneous communication of two of these communications, then the Tx UE 405 may drop the low priority sidelink communication in the resource and may transmit or receive the high priority sidelink communication (as well as the access link communication) in the resource. Thus, if there are multiple sidelink communications scheduled for a UE 120 (e.g., an Rx UE 410 and/or a Tx UE 405) in a set of conflicting resources, then the UE 120 may drop a subset of the sidelink communications in the set of conflicting resources based at least in part on a UE capability.

In some aspects, a sidelink transmission scheduled by the Tx UE 405 may be part of a group of transmissions, such as a data burst. In this case, if the Tx UE 405 drops a threshold number of transmissions included in the group of transmissions (e.g., one transmission, two transmissions, or the like), then the Tx UE 405 may drop the entire group of transmissions (or any remaining transmissions, in the group of transmissions, that have not yet been transmitted), thereby conserving network resources when the group of communications has a low likelihood of being successfully decoded by the Rx UE 410. Additionally, or alternatively, the Tx UE 405 may transmit an indication, to the Rx UE 410, that the group of transmissions has been dropped. In some aspects, if the base station 110 determines and/or receives an indication (e.g., from the Tx UE 405), that the group of transmissions is to be dropped, then the base station 110 may transmit an indication, to the Rx UE 410, that the group of transmissions has been dropped. Based at least in part on receiving this indication, the Rx UE 410 may refrain from monitoring for the transmissions included in the group of transmissions, thereby conserving resources of the Rx UE 410 (e.g., processing resources, memory resources, and/or the like).

In some aspects, if the Tx UE 405 drops a transmission scheduled for the Rx UE 410, then the Rx UE 410 may transmit a NACK corresponding to the dropped transmission because the Rx UE 410 will not receive the dropped transmission. In this case, because the NACK is due to the scheduling conflict (e.g., the dropped transmission) and not due to poor channel conditions, the Tx UE 405 may refrain from counting the NACK for a procedure that modifies transmissions due to poor channel conditions.

By dropping one or more communications in conflicting resources, the Tx UE 405 may avoid violating a UE capability, such as an access link capability, a sidelink capability, and/or a joint capability. Furthermore, by dropping according to a prioritization rule, the Tx UE 405 may ensure that higher priority communications are transmitted or received in the conflicting resources. In this way, latency, reliability, and/or performance may be improved for the higher priority communications.

In some aspects, a prioritization rule described herein may be defined solely for the access link (e.g., for different types of access link communications) to prioritize different types of traffic flows over the access link, such as by prioritizing ultra-reliable low latency communication (URLLC) traffic over enhanced mobile broadband (eMBB) traffic. Additionally, or alternatively, the same or similar rules may be applied to prioritize a set of traffic flows over a set of sidelinks and access links. For communications over only the access link, the prioritization rules may be less complex because all of the traffic flows may be scheduled by a common entity, such as a base station 110, which may thus be aware of all of prioritization. When sidelink communications are also involved in such prioritization, some of the scheduling may occur at a UE 120, which may require some additional signaling, such as to inform a receiver about the transmit prioritization, or to inform a transmitter about the receiver prioritization.

As indicated above, FIG. 6 is provided as an example. Other examples may differ from what is described with respect to FIG. 6.

Figure 7:
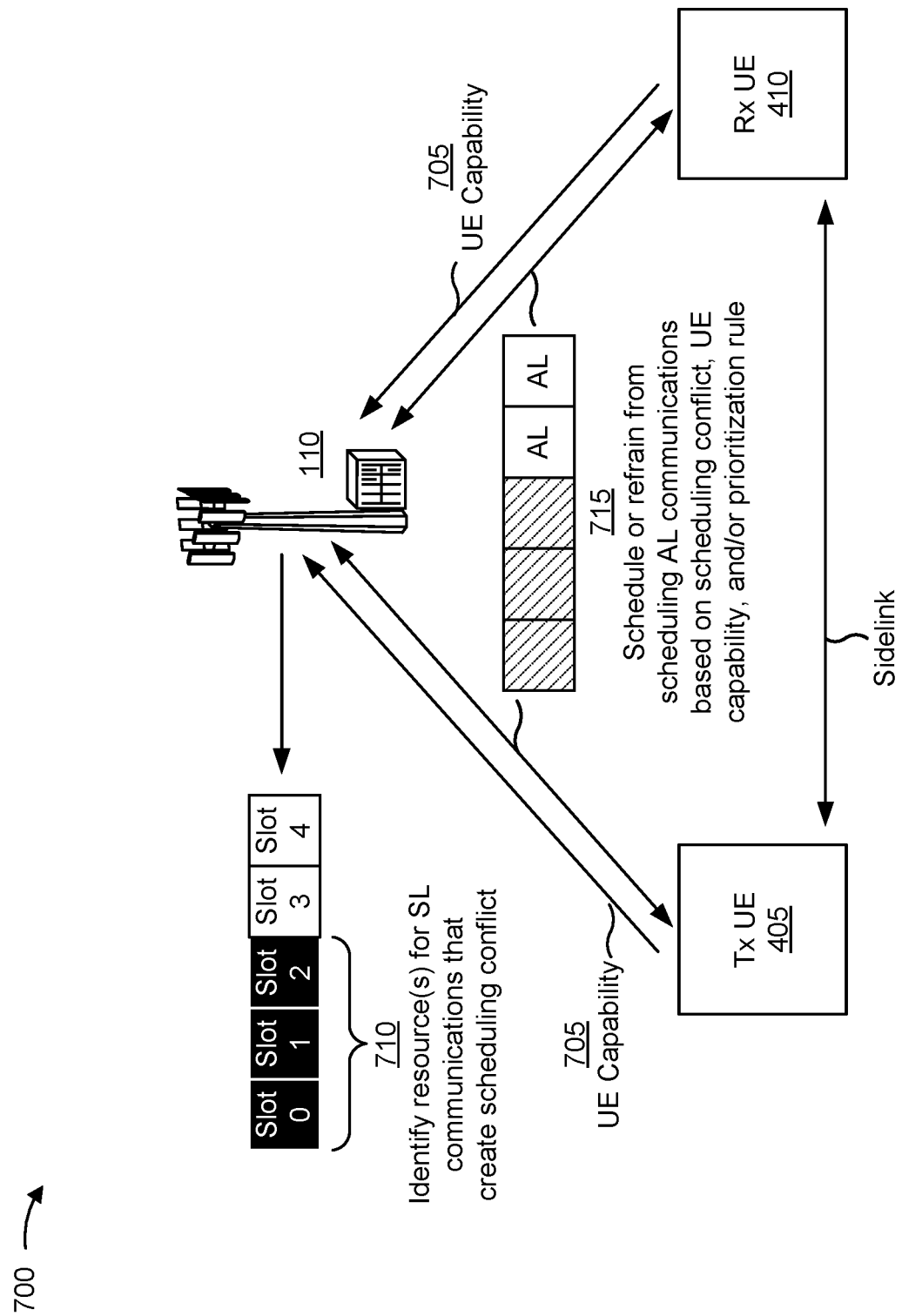

FIG. 7 is a diagram illustrating another example 700 of handling scheduling conflicts between access link communications and sidelink communications, in accordance with various aspects of the present disclosure.

As shown in FIG. 7, a base station 110 may communicate with a Tx UE 405 and/or an Rx UE 410 via respective access links, and the Tx UE 405 and the Rx UE 410 may communicate with one another via a sidelink. As indicated above in connection with FIG. 5, the Tx UE 405 and/or the Rx UE 410 may correspond to one or more UEs described elsewhere herein, such as the UE 120 of FIG. 1, the UE 305-1 of FIG. 3, the UE 305-2 of FIG. 3, and/or the like.

As shown by reference number 705, the base station 110 may receive a report indicating a UE capability of a UE 120. For example, the base station 110 may receive a capability report for the Tx UE 405, may receive a capability report for the Rx UE 410, and/or the like. A capability indicated in the capability report may include one or more capabilities described above in connection with FIGS. 5 and 6.

As shown by reference number 710, the base station 110 may identify a scheduling conflict between an access link communication and a sidelink communication. For example, the base station 110 may identify a first set of resources for an access link communication between the base station 110 and a first UE 120 (e.g., one of the Tx UE 405 or the Rx UE 410), may identify a second set of resources for a sidelink communication between the first UE 120 and a second UE 120 (e.g., one of the Tx UE 405 or the Rx UE 410), and may identify a scheduling conflict between the first set of resources and the second set of resources, in a similar manner as described above in connection with FIGS. 5 and 6. In some aspects, the base station 110 may identify the scheduling conflict based at least in part on a capability of the first UE 120, in a similar manner as described above.

In some aspects, the base station 110 may identify the first set of resources for the access link communication with the first UE 120 based at least in part on a configuration for the UE 120 (e.g., transmitted in an RRC message to the first UE 120), such as when the access link communication is a PDCCH communication, a PUCCH communication, an SPS communication, a CG communication, and/or the like. Additionally, or alternatively, the base station 110 may identify the first set of resources for the access link communication with the first UE 120 based at least in part on scheduling information for the first UE 120 (e.g., transmitted in DCI for the first UE 120), such as when the access link communication is a PDSCH communication, a PUSCH communication, and/or the like.

In some aspects, the base station 110 may identify the second set of resources for the sidelink communication based at least in part on sidelink configuration configured for the first UE 120 (e.g., transmitted in an RRC message to the first UE 120). For example, the base station 110 may configure a sidelink resource pool (e.g., an Rx resource pool for sidelink reception) for the first UE 120, which may indicate a set of resources (e.g., monitoring occasions) for the PSCCH and/or a set of possible locations of PSSCH resources.

Additionally, or alternatively, the base station 110 may identify the second set of resources for the sidelink communication by monitoring for SCI transmitted from the Tx UE 405 to the Rx UE 410 (e.g., by monitoring a set of configured sidelink monitoring occasions). The SCI may indicate a resource allocation for the PSSCH, which may indicate the second set of resources that may cause a scheduling conflict. In this case, a timing value indicated in the SCI for a timing between the SCI and a corresponding PSSCH communication may be configured to satisfy a threshold (e.g., to be greater than or equal to a threshold) so that the base station 110 has sufficient time to process the SCI to avoid scheduling conflicts with the PSSCH communication.

In some aspects, the first UE 120 and the second UE 120 are both connected to the base station 110. In this case, the base station 110 can use a sidelink configuration and/or scheduling information determined by the base station 110 to identify the first set of resources and/or the second set of resources. However, if the base station 110 is a first base station, and if one of the UEs 120 is connected to a second base station, then the second base station may transmit (e.g., directly via a connection with the first base station or indirectly via a core network) a sidelink configuration and/or scheduling information for that UE 120 to the first base station. The first base station may use the sidelink configuration and/or the scheduling information to identify the first set of resources and/or the second set of resources, as described above.

In some aspects, an Rx UE 410 may transmit an indication of one or more resources in which the Rx UE 410 is to perform DRX and/or sidelink communication skipping for sidelink communications (e.g., for one or more resources in a configured sidelink resource pool). In some aspects, the Rx UE 410 may transmit this indication directly to the base station 110. In some aspects, the base station 110 may transmit (e.g., forward, relay, and/or the like) the indication to the Tx UE 405. Additionally, or alternatively, the Rx UE 410 may transmit this indication directly to the Tx UE 405. In some aspects, the Tx UE 405 may transmit (e.g., forward, relay, and/or the like) the indication to the base station 110. In some aspects, the base station 110 may configure the one or more resources for DRX and/or sidelink communication skipping, and may indicate the one or more resources to one or both of the Tx UE 405 or the Rx UE 410. In any case, the base station 110 may use the indication to identify the second set of resources for a sidelink communication. For example, the second set of resources may exclude the one or more resources indicated by the Rx UE 410 for DRX and/or sidelink communication skipping.

As shown by reference number 715, the base station 110 may schedule or may refrain from scheduling access link communication in one or more conflicting resources based at least in part on the scheduling conflict, a UE capability, and/or a prioritization rule. For example, if scheduling an access link communication in a conflicting resource would violate a UE capability, then the base station 110 may refrain from scheduling an access link communication in the conflicting resource (e.g., if the prioritization rule indicates that sidelink communications have a higher priority than access link communications).

In some aspects, when the base station 110 configures a sidelink resource pool for the first UE 120, then the base station 110 may refrain from scheduling an access link communication in any of the resources included in the sidelink resource pool (e.g., PSCCH monitoring occasions and/or possible PSSCH resource locations). In this way, scheduling conflicts can be avoided. Alternatively, for more efficient network resource usage, the base station 110 may refrain from scheduling an access link communication for a UE 120 in any resources indicated in SCI that indicates a resource allocation for the UE 120.

As indicated above, FIG. 7 is provided as an example. Other examples may differ from what is described with respect to FIG. 7.

Figure 8:
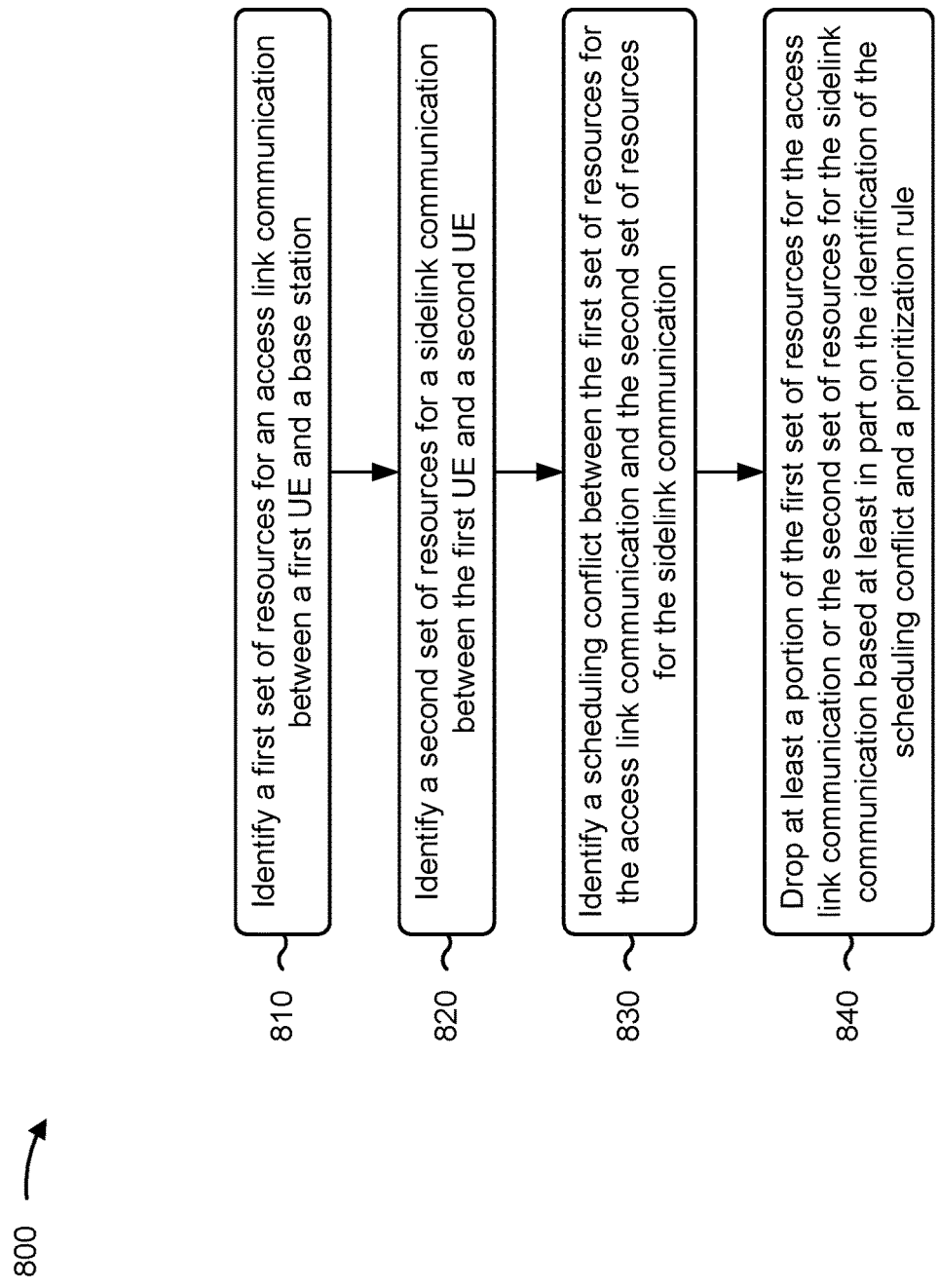
FIG. 8 is a diagram illustrating an example process performed, for example, by a user equipment, in accordance with various aspects of the present disclosure.

FIG. 8 is a diagram illustrating an example process 800 performed, for example, by a first UE, in accordance with various aspects of the present disclosure. Example process 800 is an example where a first UE (e.g., UE 120, UE 305-1, UE 305-2, Tx UE 405, Rx UE 410, and/or the like) performs operations associated with handling scheduling conflicts between access link communications and sidelink communications.

As shown in FIG. 8, in some aspects, process 800 may include identifying a first set of resources for an access link communication between the first UE and a base station (block 810). For example, the first UE (e.g., using receive processor 258, transmit processor 264, controller/processor 280, memory 282, identification component 1006, and/or the like) may identify a first set of resources for an access link communication between the first UE and a base station, as described above.

As further shown in FIG. 8, in some aspects, process 800 may include identifying a second set of resources for a sidelink communication between the first UE and a second UE (block 820). For example, the first UE (e.g., using receive processor 258, transmit processor 264, controller/processor 280, memory 282, identification component 1006, and/or the like) may identify a second set of resources for a sidelink communication between the first UE and a second UE, as described above.

As further shown in FIG. 8, in some aspects, process 800 may include identifying a scheduling conflict between the first set of resources for the access link communication and the second set of resources for the sidelink communication (block 830). For example, the first UE (e.g., using receive processor 258, transmit processor 264, controller/processor 280, memory 282, identification component 1006, and/or the like) may identify a scheduling conflict between the first set of resources for the access link communication and the second set of resources for the sidelink communication, as described above.

As further shown in FIG. 8, in some aspects, process 800 may include dropping at least a portion of the first set of resources for the access link communication or the second set of resources for the sidelink communication based at least in part on the identification of the scheduling conflict and a prioritization rule (block 840). For example, the first UE (e.g., using receive processor 258, transmit processor 264, controller/processor 280, memory 282, dropping component 1008, and/or the like) may drop at least a portion of the first set of resources for the access link communication or the second set of resources for the sidelink communication based at least in part on the identification of the scheduling conflict and a prioritization rule, as described above.

Process 800 may include additional aspects, such as any single aspect or any combination of aspects described below and/or in connection with one or more other processes described elsewhere herein.

In a first aspect, the prioritization rule indicates that access link communications have a higher priority than sidelink communications.

In a second aspect, alone or in combination with the first aspect, the dropping comprises dropping at least a portion of the second set of resources for the sidelink communication based at least in part on the prioritization rule.

In a third aspect, alone or in combination with one or more of the first and second aspects, the dropping is further based at least in part on a capability of the first UE.

In a fourth aspect, alone or in combination with one or more of the first through third aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In a fifth aspect, alone or in combination with one or more of the first through fourth aspects, the dropping comprises dropping a subset of sidelink communications scheduled for the first UE to permit the first UE to receive the access link communication.

In a sixth aspect, alone or in combination with one or more of the first through fifth aspects, the sidelink communication is a transmission from the second UE to the first UE, and the access link communication is one of an uplink communication or a downlink communication.

In a seventh aspect, alone or in combination with one or more of the first through sixth aspects, process 800 includes transmitting (e.g., using transmit processor 264, controller/processor 280, memory 282, transmission component 1010, and/or the like) a negative acknowledgement (NACK) corresponding to the transmissions, and the NACK is transmitted in connection with an indication that the NACK is due to the scheduling conflict.

In an eighth aspect, alone or in combination with one or more of the first through seventh aspects, process 800 includes receiving (e.g., using receive processor 258, controller/processor 280, memory 282, reception component 1004, and/or the like) an indication that multiple transmissions, including the transmission, have been dropped; and refraining from monitoring for (e.g., using receive processor 258, controller/processor 280, memory 282, reception component 1004, and/or the like) the multiple transmissions based at least in part on the indication.

In a ninth aspect, alone or in combination with one or more of the first through eighth aspects, the indication that the multiple transmissions have been dropped is received from at least one of the base station or the second UE.

In a tenth aspect, alone or in combination with one or more of the first through ninth aspects, the sidelink communication is a transmission from the first UE to the second UE, and the access link communication is one of an uplink communication or a downlink communication.

In an eleventh aspect, alone or in combination with one or more of the first through tenth aspects, the transmission is dropped and a NACK corresponding to the transmission is not counted, for a procedure that modifies transmissions due to poor channel conditions, based at least in part on dropping the transmission.

In a twelfth aspect, alone or in combination with one or more of the first through eleventh aspects, the transmission is dropped, and process 800 includes transmitting (e.g., using transmit processor 264, controller/processor 280, memory 282, transmission component 1010, and/or the like) an indication to the second UE that multiple transmissions, including the transmission, have been dropped.

In a thirteenth aspect, alone or in combination with one or more of the first through twelfth aspects, the sidelink communication is a physical sidelink control channel communication and the access link communication is one of a physical downlink control channel communication or a physical uplink control channel communication, and the scheduling conflict is identified based at least in part on a radio resource control message.

In a fourteenth aspect, alone or in combination with one or more of the first through thirteenth aspects, the sidelink communication is a physical sidelink shared channel communication and the access link communication is one of a physical downlink shared channel communication or a physical uplink shared channel communication, and the scheduling conflict is identified based at least in part on at least one of sidelink control information or downlink control information.

In a fifteenth aspect, alone or in combination with one or more of the first through fourteenth aspects, the second set of resources is identified based at least in part on one or more resources in which the first UE is to perform discontinuous reception or sidelink communication skipping for sidelink communications.

In a sixteenth aspect, alone or in combination with one or more of the first through fifteenth aspects, process 800 includes transmitting (e.g., using transmit processor 264, controller/processor 280, memory 282, transmission component 1010, and/or the like) an indication of the one or more resources to at least one of the base station or the second UE.

In a seventeenth aspect, alone or in combination with one or more of the first through sixteenth aspects, the capability indicates whether the first UE is capable of transmitting or receiving multiple communications scheduled in a same set of resources.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
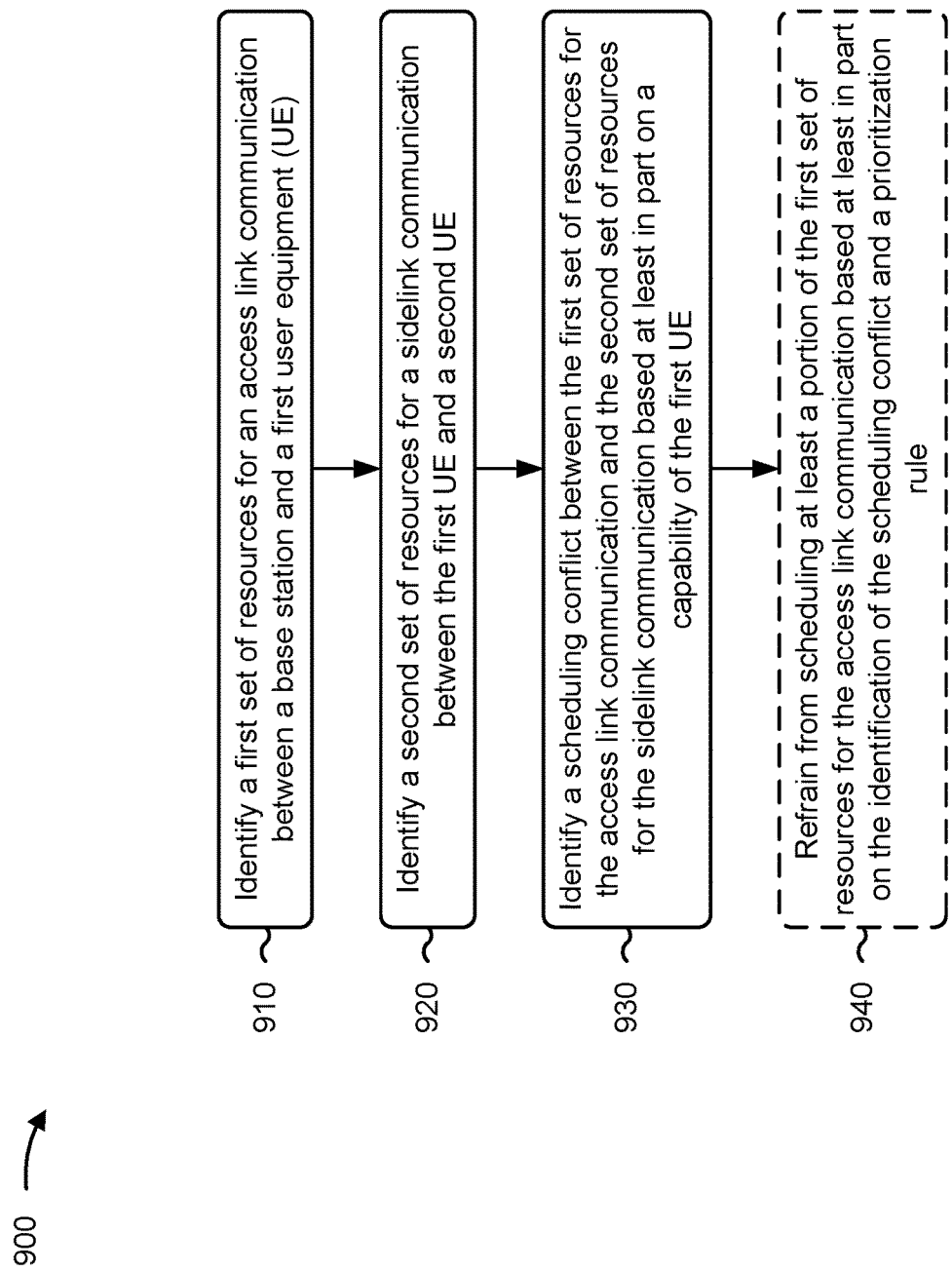
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where a base station (e.g., base station 110 and/or the like) performs operations associated with handling scheduling conflicts between access link communications and sidelink communications.

As shown in FIG. 9, in some aspects, process 900 may include identifying a first set of resources for an access link communication between the base station and a first UE (block 910). For example, the base station (e.g., using transmit processor 220, receive processor 238, controller/processor 240, memory 242, scheduler 246, identification component 1106, and/or the like) may identify a first set of resources for an access link communication between the base station and a first UE, as described above.

As further shown in FIG. 9, in some aspects, process 900 may include identifying a second set of resources for a sidelink communication between the first UE and a second UE (block 920). For example, the base station (e.g., using transmit processor 220, receive processor 238, controller/processor 240, memory 242, scheduler 246, identification component 1106, and/or the like) may identify a second set of resources for a sidelink communication between the first UE and a second UE, as described above.

As further shown in FIG. 9, in some aspects, process 900 may include identifying a scheduling conflict between the first set of resources for the access link communication and the second set of resources for the sidelink communication based at least in part on a capability of the first UE (block 930). For example, the base station (e.g., using transmit processor 220, receive processor 238, controller/processor 240, memory 242, scheduler 246, identification component 1106, and/or the like) may identify a scheduling conflict between the first set of resources for the access link communication and the second set of resources for the sidelink communication based at least in part on a capability of the first UE, as described above.

As further shown in FIG. 9, in some aspects, process 900 may include refraining from scheduling at least a portion of the first set of resources for the access link communication based at least in part on the identification of the scheduling conflict and a prioritization rule (block 940). For example, the base station (e.g., using transmit processor 220, receive processor 238, controller/processor 240, memory 242, scheduler 246, scheduling component 1108, and/or the like) may refrain from scheduling at least a portion of the first set of resources for the access link communication based at least in part on the identification of the scheduling conflict and a prioritization rule, as described above.

Process 900 may include additional aspects, such as any single aspect or any combination of aspects described below and/or in connection with one or more other processes described elsewhere herein.

In a first aspect, the second set of resources is identified based at least in part on a sidelink resource pool configured by the base station for the first UE.

In a second aspect, alone or in combination with the first aspect, the sidelink resource pool is for sidelink reception.

In a third aspect, alone or in combination with one or more of the first and second aspects, refraining from scheduling at least a portion of the first set of resources comprises refraining from scheduling the access link communication in any resource included in the sidelink resource pool.

In a fourth aspect, alone or in combination with one or more of the first through third aspects, the capability indicates at least one of: a maximum bandwidth, a maximum data rate, or a maximum rank supported by the first UE for access link communications; a maximum bandwidth, a maximum data rate, or a maximum rank supported by the first UE for sidelink communications; a maximum bandwidth, a maximum data rate, or a maximum rank supported by the first UE for joint access link and sidelink communications scheduled in a same set of resources; whether the first UE is capable of communicating using multiple beams; whether the first UE is capable of communicating in a half duplex mode or a full duplex mode; or a combination thereof.

In a fifth aspect, alone or in combination with one or more of the first through fourth aspects, the second set of resources is identified from SCI transmitted from the second UE to the first UE.

In a sixth aspect, alone or in combination with one or more of the first through fifth aspects, a timing value, indicated in the SCI for timing between the SCI and a corresponding sidelink data communication, satisfies a threshold.

In a seventh aspect, alone or in combination with one or more of the first through sixth aspects, the first UE and the second UE are connected to the base station.

In an eighth aspect, alone or in combination with one or more of the first through seventh aspects, the first UE is connected to the base station and the second UE is connected to another base station, and the base station is configured to receive a sidelink configuration of the second UE directly or indirectly from the other base station.

In a ninth aspect, alone or in combination with one or more of the first through eighth aspects, the second set of resources is identified based at least in part on one or more resources in which the first UE is to perform discontinuous reception or sidelink communication skipping for sidelink communications.

In a tenth aspect, alone or in combination with one or more of the first through ninth aspects, the one or more resources are indicated in a message received from at least one of the first UE or the second UE.

In an eleventh aspect, alone or in combination with one or more of the first through tenth aspects, the message is received from the first UE and the base station is configured to relay the message to the second UE.

In a twelfth aspect, alone or in combination with one or more of the first through eleventh aspects, the one or more resources are configured by the base station and indicated to at least one of the first UE or the second UE.

In a thirteenth aspect, alone or in combination with one or more of the first through twelfth aspects, the capability indicates whether the first UE is capable of transmitting or receiving multiple communications scheduled in a same set of resources.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
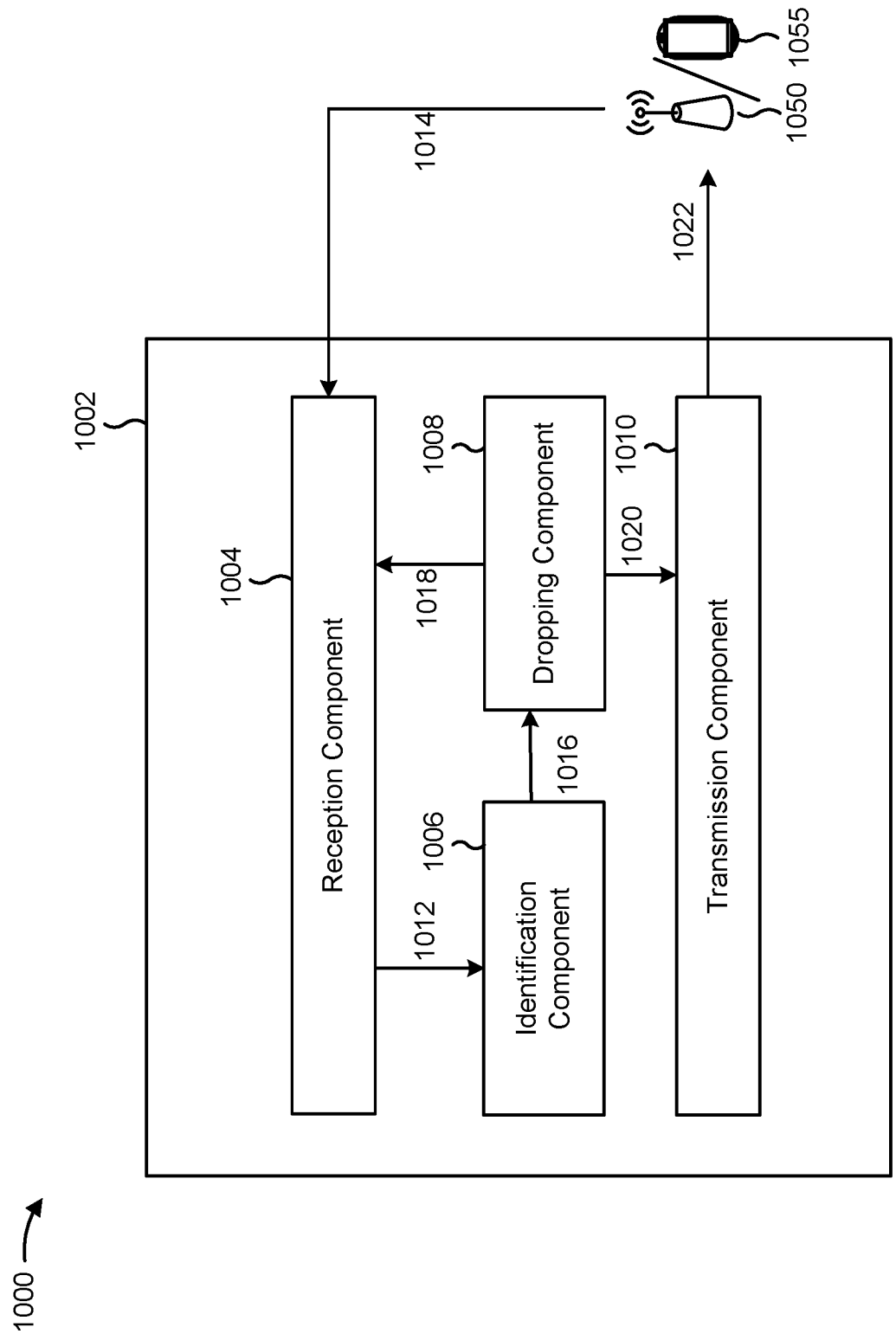
FIG. 10 is a conceptual data flow diagram illustrating a data flow between different modules/means/components in an example apparatus, in accordance with various aspects of the present disclosure.

FIG. 10 is a conceptual data flow diagram 1000 illustrating a data flow between different modules/means/components in an example apparatus 1002. The apparatus 1002 may be a UE (e.g., UE 120, UE 305-1, UE 305-2, Tx UE 405, Rx UE 410, and/or the like). In some aspects, the apparatus 1002 includes a reception component 1004, an identification component 1006, a dropping component 1008, and/or a transmission component 1010.

The identification component 1006 may identify a first set of resources for an access link communication between the apparatus 1002 (e.g., a first UE) and an apparatus 1050 (e.g., a base station) and/or may identify a second set of resources for a sidelink communication between the apparatus 1002 and another apparatus 1055 (e.g., a second UE). For example, the identification component 1006 may receive information 1012 from the reception component (which may receive information 1014 from the apparatus 1050 and/or the apparatus 1055), and may use the information 1012 to identify the first set of resources and/or the second set of resources, as described above in connection with FIGS. 5 and 6. The identification component 1006 may identify a scheduling conflict between the first set of resources for the access link communication and the second set of resources for the sidelink communication, as described above in connection with FIGS. 5 and 6. In some aspects, the identification component 1006 may provide information 1016 associated with the scheduling conflict to the dropping component 1008. The dropping component 1008 may use the information 1016 to drop at least a portion of the first set of resources for the access link communication or the second set of resources for the sidelink communication based at least in part on the identification of the scheduling conflict and a prioritization rule. In some aspects, the dropping component 1008 may provide information 1018 to the reception component 1004 to drop reception of a communication. Additionally, or alternatively, the dropping component 1008 may provide information 1020 to the transmission component 1010 to drop transmission of a communication. In some aspects, the transmission component 1010 may transmit information 1022 to the apparatus 1050 and/or the apparatus 1055, as described above in connection with FIGS. 5 and 6.

The apparatus 1002 may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
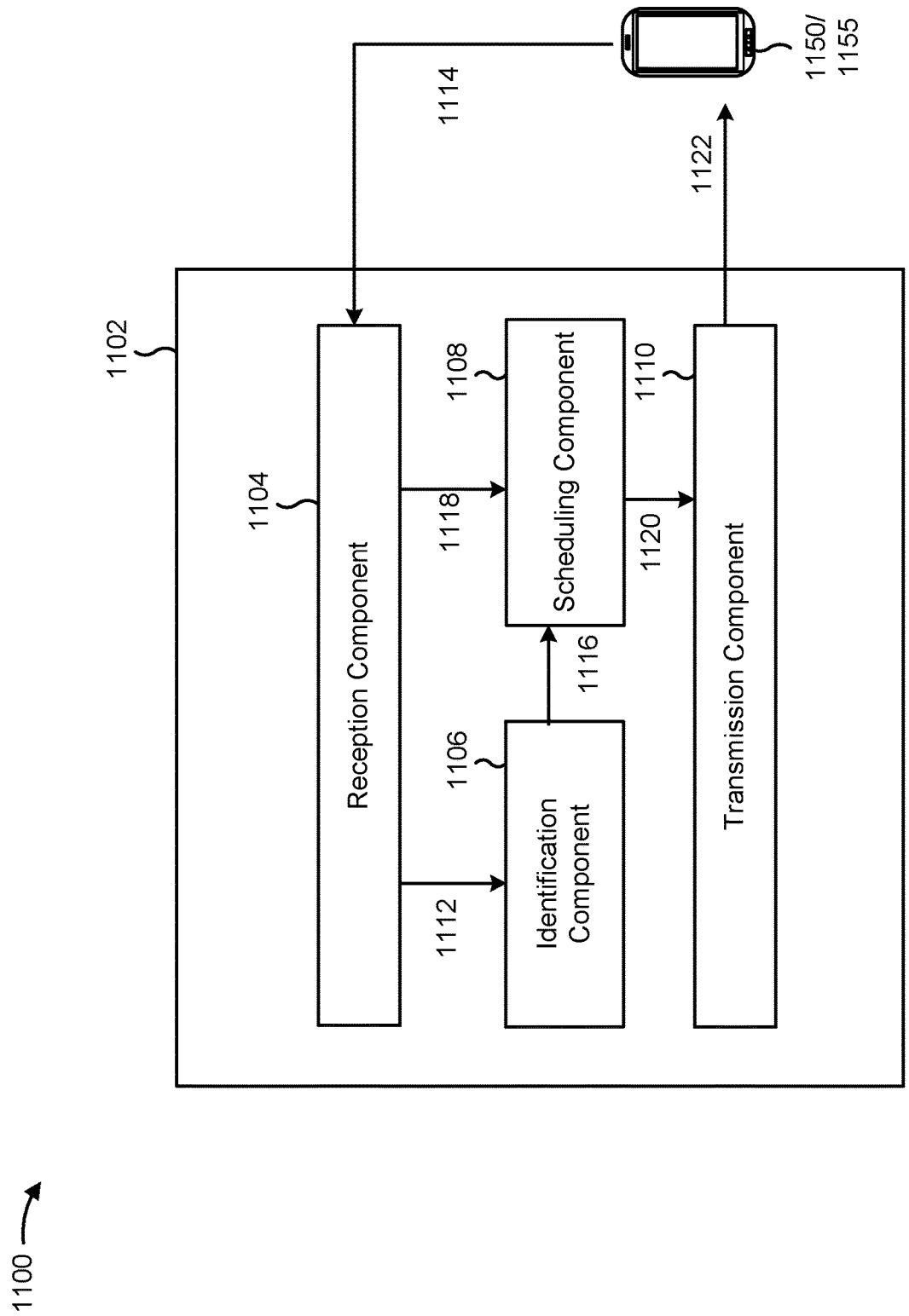
FIG. 11 is a conceptual data flow diagram illustrating a data flow between different modules/means/components in another example apparatus, in accordance with various aspects of the present disclosure.

FIG. 11 is a conceptual data flow diagram 1100 illustrating a data flow between different modules/means/components in an example apparatus 1102. The apparatus 1102 may be a base station (e.g., base station 110 and/or the like). In some aspects, the apparatus 1102 includes a reception component 1104, an identification component 1106, a scheduling component 1108, and/or a transmission component 1110.

The identification component 1106 may identify a first set of resources for an access link communication between the apparatus 1102 (e.g., a base station) and an apparatus 1150 (e.g., a first UE), may identify a second set of resources for a sidelink communication between the apparatus 1150 and another apparatus 1155 (e.g., a second UE), and may identify a scheduling conflict between the first set of resources for the access link communication and the second set of resources for the sidelink communication, as described above in connection with FIG. 7. For example, the identification component 1106 may receive information 1112 from the reception component (which may receive information 1114 from the apparatus 1150 and/or the apparatus 1155), and may use the information 1112 to identify the scheduling conflict, as described above in connection with FIG. 7. In some aspects, the identification component 1106 may provide information 1116 associated with the scheduling conflict to the scheduling component 1108. The scheduling component 1108 may use the information 1116 to schedule or refrain from scheduling at least a portion of the first set of resources for the access link communication based at least in part on the identification of the scheduling conflict and a prioritization rule, as described above in connection with FIG. 7. In some aspects, the scheduling component 1108 may provide scheduling information 1118 to the reception component 1104 and/or may provide information 1120 to the transmission component 1110 to schedule and/or to refrain from scheduling a communication. In some aspects, the transmission component 1110 may transmit information 1122 to the apparatus 1150 and/or the apparatus 1155, as described above in connection with FIG. 7

The apparatus 1102 may include additional components that perform each of the blocks of the algorithm in the aforementioned process 900 of FIG. 9 and/or the like. Each block in the aforementioned process 900 of FIG. 9 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software.

The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A first user equipment (UE) for wireless communication, comprising:
 a one or more memories; and
 one or more processors, coupled to the one or more memories, configured to:
  receive an indication of a first set of resources for an access link communication;
  receive an indication of a second set of resources for a sidelink communication between the first UE and a second UE; and
  communicate using at least one of the first set of resources for the access link communication or the second set of resources for the sidelink communication based at least in part on:
   a capability of the first UE with regard to communicating the access link communication and the sidelink communication in a same set of resources,
   a prioritization rule, and
   a scheduling conflict between the first set of resources for the access link communication and the second set of resources for the sidelink communication.

2. The first UE of claim 1, wherein the second UE is a wearable device.

3. The first UE of claim 2, wherein the wearable device is a smart watch or smart glasses.

4. The first UE of claim 1, wherein the sidelink communication is via one or more sidelink channels between the first UE and the second UE.

5. The first UE of claim 4, wherein the one or more sidelink channels include a physical sidelink shared channel (PSSCH).

6. The first UE of claim 4, wherein the one or more sidelink channels include a physical sidelink control channel (PSCCH).

7. The first UE of claim 1, wherein the capability of the first UE indicates that the first UE is capable of simultaneously communicating the access link communication and the sidelink communication in the same set of resources.

8. The first UE of claim 1, wherein the capability of the first UE indicates that the first UE is not capable of simultaneous communicating the access link communication and the sidelink communication in the same set of resources.

9. The first UE of claim 1, wherein the capability of the first UE is with regard to receiving the access link communication and the sidelink communication in the same set of resources.

10. The first UE of claim 1, wherein the capability of the first UE indicates whether the first UE is capable of transmitting the access link communication and transmitting the sidelink communication in the same set of resources.

11. The first UE of claim 1, wherein the capability of the first UE indicates whether the first UE is capable of transmitting the sidelink communication and receiving the access link communication in the same set of resources.

12. The first UE of claim 1, wherein, to communicate using at least one of the first set of resources for the access link communication or the second set of resources for the sidelink communication, the one or more processors are configured to:
refrain from transmitting at least a portion of the first set of resources for the access link communication or the second set of resources for the sidelink communication based on the scheduling conflict being in one or more slots that are included in the first set of resources for the access link communication and the second set of resources for the sidelink communication.

13. The first UE of claim 1, wherein, to communicate using at least one of the first set of resources for the access link communication or the second set of resources for the sidelink communication, the one or more processors are configured to:
refrain from transmitting at least a portion of the first set of resources for the access link communication or the second set of resources for the sidelink communication based on the scheduling conflict and based on the prioritization rule indicating whether to prioritize access link communications over sidelink communications or whether to prioritize sidelink communications over access link communications.

14. The first UE of claim 13, wherein, to refrain from transmitting at least the portion of the first set of resources for the access link communication or the second set of resources for the sidelink communication, the one or more processors are configured to:
refrain from transmitting the sidelink communication in one or more slots based on the scheduling conflict and based on the prioritization rule indicating that access link communications have higher priority than sidelink communications.

15. The first UE of claim 1, wherein, to communicate using at least one of the first set of resources for the access link communication or the second set of resources for the sidelink communication, the one or more processors are configured to:
communicate using at least one of the first set of resources for the access link communication or the second set of resources for the sidelink communication based on the prioritization rule indicating that the sidelink communication is to be maintained when the scheduling conflict occurs and based on the capability of the first UE indicating that the first UE is capable of simultaneously communicating the access link communication and the sidelink communication in the same set of resources.

16. The first UE of claim 15, wherein the sidelink communication is a high priority sidelink communication relative to a low priority sidelink communication between the first UE and a third UE.

17. The first UE of claim 1, wherein the prioritization rule differs for different sidelink channel conditions.

18. The first UE of claim 1, wherein the prioritization rule differs for different access link channel conditions.

19. The first UE of claim 1, wherein the prioritization rule differs for different quality of services (QoS) requirements associated with one or more of the access link communication or the sidelink communication.

20. The first UE of claim 1, wherein the prioritization rule differs based on whether at least one of the access link communication or the sidelink communication carries data information or control information.

21. The first UE of claim 1, wherein the prioritization rule differs based on a type of control information carried in the access link communication or the sidelink communication.

22. A method of wireless communication performed by a first user equipment (UE), comprising:
receiving an indication of a first set of resources for an access link communication;
receiving an indication of a second set of resources for a sidelink communication between the first UE and a second UE; and
communicating using at least one of the first set of resources for the access link communication or the second set of resources for the sidelink communication based at least in part on:
a capability of the first UE with regard to communicating the access link communication and the sidelink communication in a same set of resources,
a prioritization rule, and
a scheduling conflict between the first set of resources for the access link communication and the second set of resources for the sidelink communication.

23. The method of claim 22, wherein the second UE is a smart watch or smart glasses.

24. The method of claim 22, wherein the sidelink communication is via one or more of a physical sidelink shared channel (PSSCH) or a physical sidelink control channel (PSCCH).

25. The method of claim 22, wherein the capability of the first UE indicates that the first UE is capable of simultaneously communicating the access link communication and the sidelink communication in the same set of resources.

26. The method of claim 22, wherein the capability of the first UE indicates that the first UE is not capable of simultaneous communicating the access link communication and the sidelink communication in the same set of resources.

27. A user equipment (UE) for wireless communication, comprising:
one or more memories; and
one or more processors, coupled to the one or more memories, configured to:
  transmit, to a different UE, an indication of a set of resources for a sidelink communication between the UE and the different UE; and
  communicate, with the different UE, using the set of resources for the sidelink communication based at least in part on:
    a capability of the different UE with regard to communicating an access link communication and the sidelink communication in a same set of resources,
    a prioritization rule, and
    a scheduling conflict between a different set of resources for the access link communication and the set of resources for the sidelink communication.

28. The UE of claim 27, wherein the UE is a wearable device.

29. The UE of claim 27, wherein the capability of the different UE is with regard to the different UE receiving the access link communication and the sidelink communication in the same set of resources.

30. The UE of claim 27, wherein, to communicate using the set of resources for the sidelink communication, the one or more processors are configured to:
  communicate using the set of resources for the sidelink communication based on the prioritization rule indicating that the sidelink communication is to be maintained when the scheduling conflict occurs and based on the capability of the different UE indicating that the different UE is capable of simultaneously communicating the access link communication and the sidelink communication in the same set of resources.

* * * * *